(12) United States Patent (10) Patent No.: US 12,675,697 B2
Sakai (45) Date of Patent: Jul. 7, 2026

(54) COMPUTER-READABLE RECORDING MEDIUM HAVING STORED THEREIN MACHINE LEARNING PROGRAM, METHOD FOR MACHINE LEARNING, AND INFORMATION PROCESSING APPARATUS

(71) Applicant: FUJITSU LIMITED, Kawasaki (JP)

(72) Inventor: Yasufumi Sakai, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 778 days.

(21) Appl. No.: 17/886,499

(22) Filed: Aug. 12, 2022

(65) Prior Publication Data

US 2023/0162036 A1 May 25, 2023

(30) Foreign Application Priority Data

Nov. 25, 2021 (JP) ................................. 2021-191284

(51) Int. Cl.
*G06N 3/082* (2023.01)
(52) U.S. Cl.
CPC .................................... *G06N 3/082* (2013.01)
(58) Field of Classification Search
CPC .................................................... G06N 3/082
USPC .......................................................... 706/15
See application file for complete search history.

(56) References Cited

U.S. PATENT DOCUMENTS

2021/0241172 A1   8/2021  Toshiba
2022/0207359 A1*  6/2022  Yao ......................... G06N 3/044
2023/0100930 A1*  3/2023  Tan ......................... G06N 3/063
                                                    706/25

FOREIGN PATENT DOCUMENTS

JP          2021-124949 A      8/2021

OTHER PUBLICATIONS

Luo et al., "ThiNet: A filter level pruning method for deep neural network compression", ICCV 2017, 2017 (Year: 2017).*

(Continued)

*Primary Examiner* — Tsu-Chang Lee
(74) *Attorney, Agent, or Firm* — Fujitsu Intellectual Property Center

(57) ABSTRACT

A computer-readable recording medium has stored therein a machine learning program for causing a computer to execute a process including: selecting a reduction ratio of each element of a plurality of layers in a trained model of a neural network including the plurality of layers; and adjusting, when the neural network includes a calculating process that outputs a tensor serving as a result of a given calculation on a tensor from a first layer and one or more tensors of one or more second layers preceding the first layer, a first reduction ratio and one or more second reduction ratios based on one or more elements to be reduced in the first layer at the first reduction ratio and one or more elements to be reduced in each of the one or more second layers at the one or more second reduction ratios.

15 Claims, 30 Drawing Sheets

(56) References Cited

OTHER PUBLICATIONS

Extended European Search Report dated Mar. 30, 2023 for corresponding European Patent Patent Application No. 22191436.9, 8 pages.

Li, Dong et al., "Towards Optimal Filter Pruning with Balanced Performance and Pruning Speed", Feb. 25, 2021, 16th European Conference—Computer Vision—ECCV 2020, pp. 252-267, XP047577598.

European Office Action dated Apr. 17, 2026 for corresponding European Patent Application No. 22191436.9, 7 pages. *Please note NPL Li, Dong et al. "Towards Optimal Filter Pruning with Balanced Performance and Pruning Speed" was previously cited in an IDS filed Jun. 9, 2023 .*.

* cited by examiner

|  | before pruning | after pruning |
|---|---|---|
| layer 1 | [1 0 1 0] | [1 0] |
| layer 3 | [0 1 1 0] | [0 1 0] |
| result of Concat calculation | [1 1 2 0] | [ ] |

Since the sizes of tensors input into Concat unit are different from each other, Concat calculation cannot be performed.

|  | accuracy before pruning | accuracy after pruning | data size compression rate of model after pruning |
|---|---|---|---|
| conditions (I) and (II) are not applied | 93.1 % | 92.5 % | 84.1% |
| conditions (I) and (II) are applied | 93.1 % | 92.2 % | 96.4% |

COMPUTER-READABLE RECORDING MEDIUM HAVING STORED THEREIN MACHINE LEARNING PROGRAM, METHOD FOR MACHINE LEARNING, AND INFORMATION PROCESSING APPARATUS

CROSS-REFERENCE TO RELATED APPLICATION

This application is based upon and claims the benefit of priority of the prior Japanese Patent application No. 2021-191284, filed on Nov. 25, 2021, the entire contents of which are incorporated herein by reference.

FIELD

The embodiments discussed herein are related to a computer-readable recording medium having stored therein a machine learning program, a method for machine learning, and an information processing apparatus.

BACKGROUND

NNs (Neural Networks), which are used for AI (Artificial Intelligence) tasks such as image processing, tend to achieve high performance (e.g., high inference accuracy) with complex configurations. On the other hand, the complex configurations of NNs may increase the number of times of calculation in executing the NNs by calculators and the size of memory used in executing the NNs by the calculators.

As a method for reducing the number of times of calculation, in other words, shortening calculation durations (speeding up), and for reducing the size of memory, in other words, downsizing machine learning models of NNs, "pruning" has been known.

The pruning is a method for reducing the data size of the machine learning models and for reducing the calculation durations and communication durations by reducing (pruning) at least one type of elements among edges (weights), nodes, and channels of NNs.

Excessive pruning causes degradation of inference accuracy of NNs. Therefore, it is important to perform pruning of NNs while maintaining the inference accuracy or while keeping the degraded level of inference accuracy at a predetermined level.

For example, in pruning, a known method selects a layer that does not significantly affect the inference accuracy of NNs. This method, for example, determines a channel of a convolutional layer to be pruned based on parameters used in a Batch Normalization (BN) layer that follows a convolutional layer.

[Patent Document 1] Japanese Laid-open Patent Publication No. 2021-124949

The method for selecting the layer that does not significantly affect the inference accuracy of NNs is applied to the convolutional layer to which the BN layer is connected, but is not assumed to be applied to other layers such as the convolutional layers to which no BN layer is connected or fully connected layers.

A NN including multiple layers sometimes includes a concatenating calculating unit that performs a concatenating operation that concatenates inputs from two or more layers. Hereinafter, a concatenating operation is sometimes referred to as a "concat operation" and a concatenating calculating unit is sometimes referred to as a "concat unit".

The concat unit performs an arithmetic operation that shortcut-concatenates a tensor from a certain layer and tensors input from one or more layers preceding the certain layer and outputs one tensor. For example, the shortcut-concatenating includes an operation on such input tensors, which operation is exemplified by addition in units of dimension and element.

For example, a NN is assumed to include a concat unit under a circumstance where a scheme to select a layer that does not largely affect the inference accuracy of the NNs can be applied to the above multiple layers. Under this circumstance, pruning in the above scheme may mismatch the dimensions (matrix sizes) of the tensors between two or more layers that input the tensors into the concat unit, and has a possibility that an output of the correct result of the calculation is not obtained from the concat unit.

To avoid such inconvenience, one of the solutions may exclude the two or more layers that input tensors into the concat unit from layers of targets of pruning. However, this solution lowers the pruning rate of overall model to be trained through a machine learning technique, and consequently, the effect brought by compression (size reduction) of data size of the model to be trained by the pruning.

SUMMARY

According to an aspect of the embodiments, a non-transitory computer-readable recording medium has stored therein a machine learning program for causing a computer to execute a process including: selecting a reduction ratio of each element of a plurality of layers in a trained model of a neural network including the plurality of layers; and adjusting, when the neural network includes a calculating process that outputs a tensor serving as a result of a given calculation on a tensor from a first layer and one or more tensors of one or more second layers preceding the first layer, a first reduction ratio and one or more second reduction ratios based on one or more elements to be reduced in the first layer at the first reduction ratio and one or more elements to be reduced in each of the one or more second layers at the one or more second reduction ratios.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram for explaining an example of a process that determines a channel of a convolutional layer to be pruned;

FIG. 10 is a diagram explaining an example of a method for determining a channel to be pruned;

FIG. 17 is a diagram illustrating an example of tensors before and after a scheme according to the one embodiment is applied to the NN including the concat unit;

FIG. 18 is a diagram illustrating an example of operation of a calculating unit on a NN including a concat unit;

FIG. 19 is a diagram illustrating an example of a NN including multiple concat units;

FIG. 20 is a diagram illustrating an example of accuracy before and after pruning and a compression rate of a data size in the NN of FIG. 19 in cases where conditions (I) and (II) are applied and not applied;

FIG. 30 is a block diagram illustrating an example of a hardware (HW) configuration of a computer.

DESCRIPTION OF EMBODIMENT(S)

Figure 2:
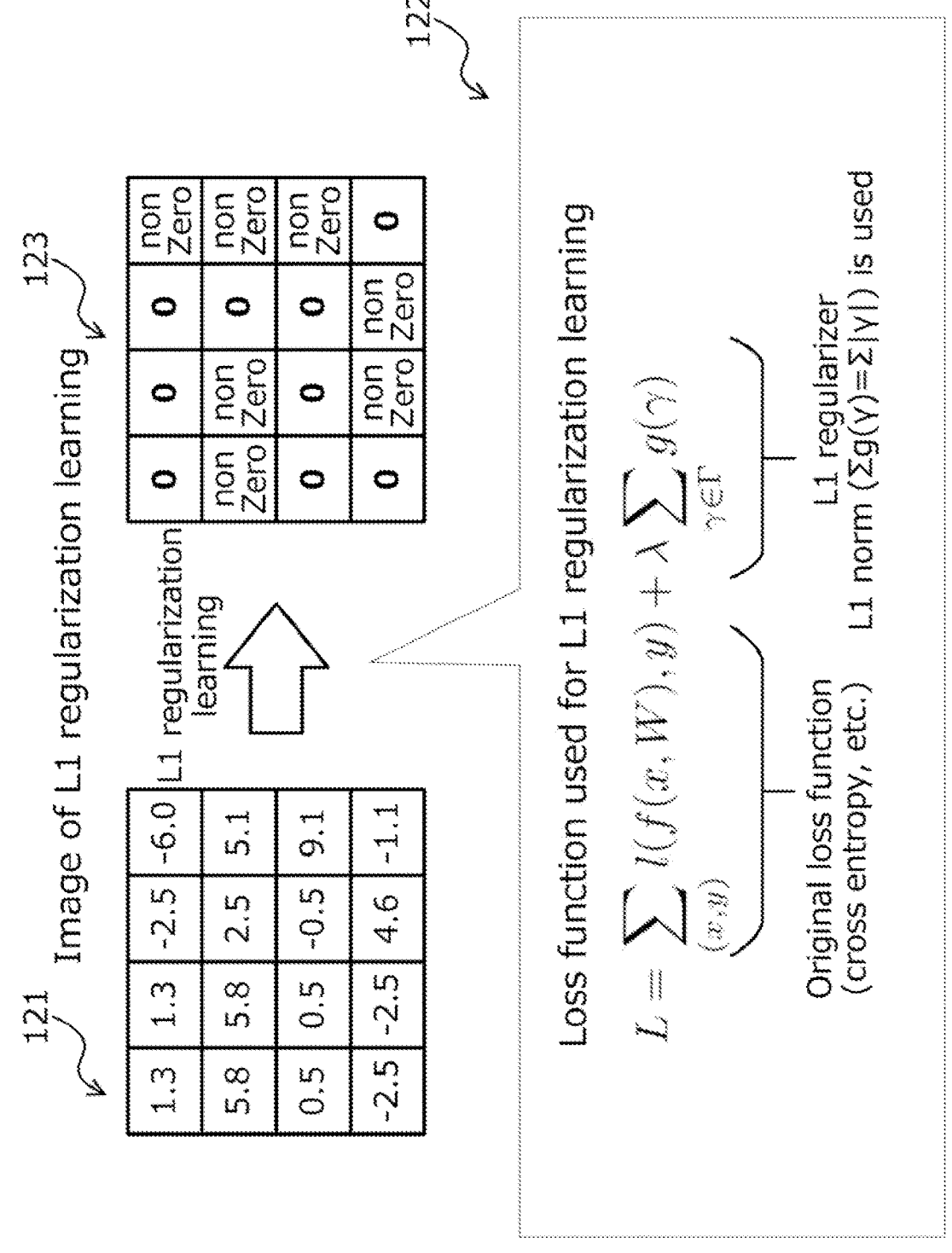
FIG. 2 is a diagram illustrating an example of L1 regularization learning.

Hereinafter, an embodiment of the present disclosure will now be described with reference to the drawings. However, the embodiment described below is merely illustrative and there is no intention to exclude the application of various modifications and techniques that are not explicitly described in the embodiment. For example, the present embodiment can be variously modified and implemented without departing from the scope thereof. In the drawings used in the following description, the same reference numerals denote the same or similar parts unless otherwise specified.

<1> One Embodiment

Figure 1:
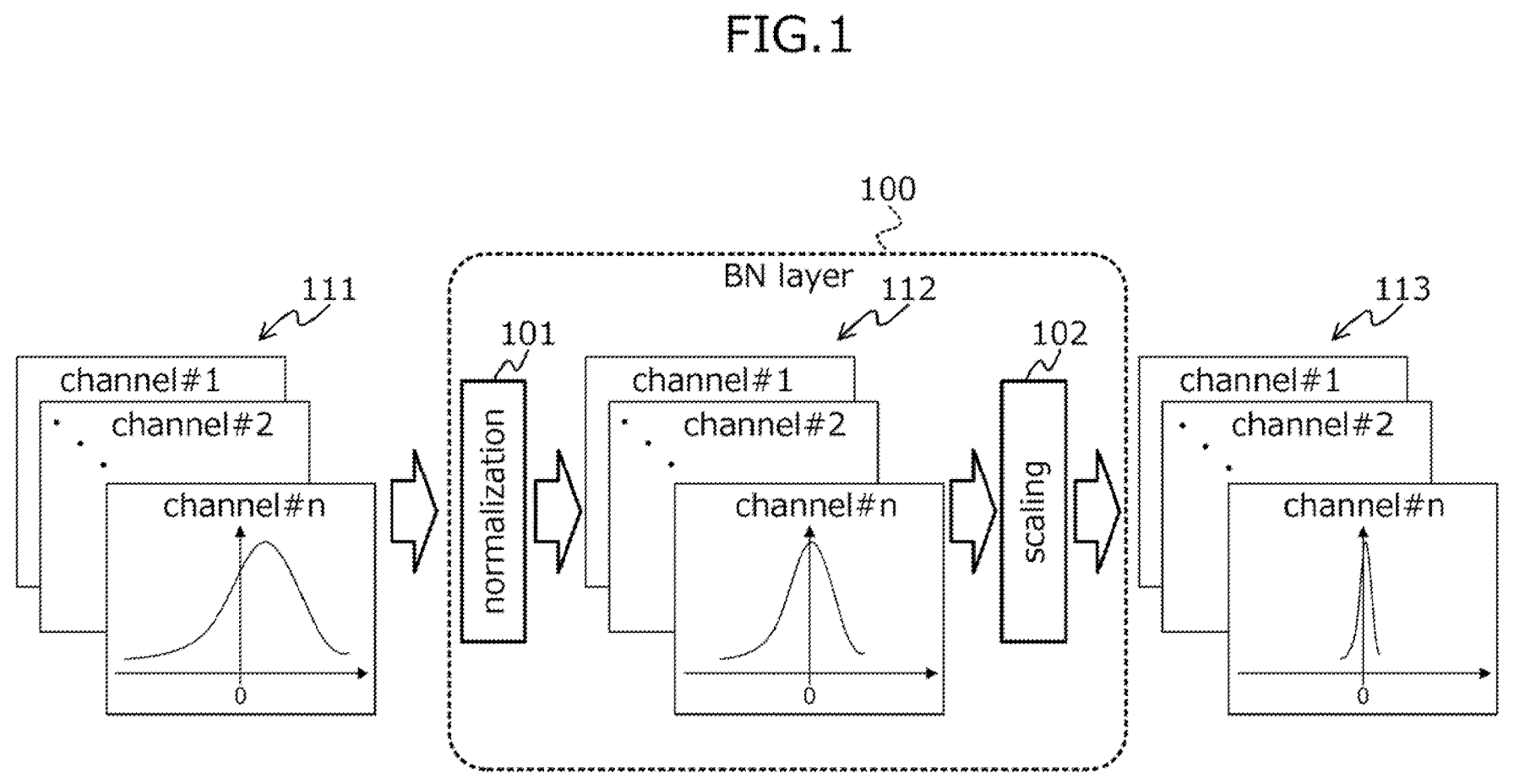

FIG. 1 is a diagram for explaining an example of a process that determines a channel of a convolutional layer to be pruned, and FIG. 2 is a diagram illustrating an example of L1 regularization learning. As a method for selecting a layer that does not significantly affect inference accuracy of an NN, FIG. 1 illustrates a method in which a calculator uses a scaling factor $\gamma$ used in a BN layer 100 that follows a convolutional layer to determine a channel of a convolutional layer to be pruned. The graphs illustrated in channels 111 to 113 in FIG. 1 represent distribution of output tensors.

As depicted in FIG. 1, the calculator executes a normalization 101 for each of multiple channels 111 (#1 to #n; n is an integer of 2 or more) inputted from a convolutional layer to the BN layer 100. For example, in the normalization 101, in accordance with the following equation (1), the calculator calculates a mean value $\mu$ and a variance $\sigma^2$ for each channel 111 to obtain multiple channels 112 (#1 to #n) that represent normalized distribution of mean "0" and variance "1". In the following equation (1), $z_{in}$ and $z_{mid}$ represent channels 111 and 112, respectively, and $\mu_B$ and $\sigma_B{}^2$ represent the mean value and the variance in the current mini-batch B, respectively.

[Equation 1]

$$z_{mid} = \frac{z_{in} - \mu_B}{\sqrt{\sigma_B^2 + \epsilon}} \tag{1}$$

The calculator executes scaling 102 for the multiple channels 112 (#1 to #n). For example, in the scaling 102, in accordance with the following equation (2), the calculator multiplies each of the multiple channels 112 by the scaling factor $\gamma$, and adds a bias $\beta$ to the multiplication result to output multiple channels 113 (#1 to #n) that represent distribution scaled by the parameters $\gamma$ and $\beta$. In the following equation (2), $z_{out}$ represents the channels 113. The parameters $\gamma$ and $\beta$ may be optimized by machine learning.

[Equation 2]

$$z_{out} = \gamma z_{mid} + \beta \tag{2}$$

At this step, the output is almost eliminated for the channel 113 (channel #n in the example of FIG. 1) resulted from the scaling 102 when $\gamma$ is small. This means that inference accuracy of the NN is not significantly affected even if the channel is deleted by pruning. Thus, the calculator determines the channel as a pruning target in units of channels by searching for a small (e.g., "0") $\gamma$.

For example, the calculator searches for a small (diminishing) $\gamma$ by applying L1 regularization learning to $\gamma$. The L1 regularization learning is a machine learning technique known to be capable of making a parameter to be learned "sparse" by performing machine learning while adding a regularizer of L1 to a loss function calculated by the NN at the output.

As illustrated in FIG. 2, the calculator performs the L1 regularization learning using a loss function 122 on a vector

121 to obtain a vector 123 on which the L1 regularization has been performed. The loss function 122 may be, as expressed by the following equation (3), a function L obtained by adding an original loss function (first term) such as cross entropy and an L1 regularizer (second term) that uses an L1 norm ($\Sigma g(\gamma) = \Sigma |\gamma|$).

[Equation 3]

$$L = \sum_{(x,y)} l(f(x, W), y) + \lambda \sum_{\gamma \in \Gamma} g(\gamma) \quad (3)$$

The L1 regularization learning causes each parameter of the vector 123 to indicate (dichotomize) whether each parameter of the vector 121 becomes zero or non-zero. By using such L1 regularization learning, the calculator can identify a channel(s) in which $\gamma$ becomes zero (close to zero) as the channel of the pruning target.

The identification of the pruning target using the L1 regularization learning depicted in FIGS. 1 and 2 is applied to the convolutional layer to which the BN layer is connected, but is not assumed to be applied to other layers such as the convolutional layers to which no BN layer is connected and the fully connected layers.

Figure 3:
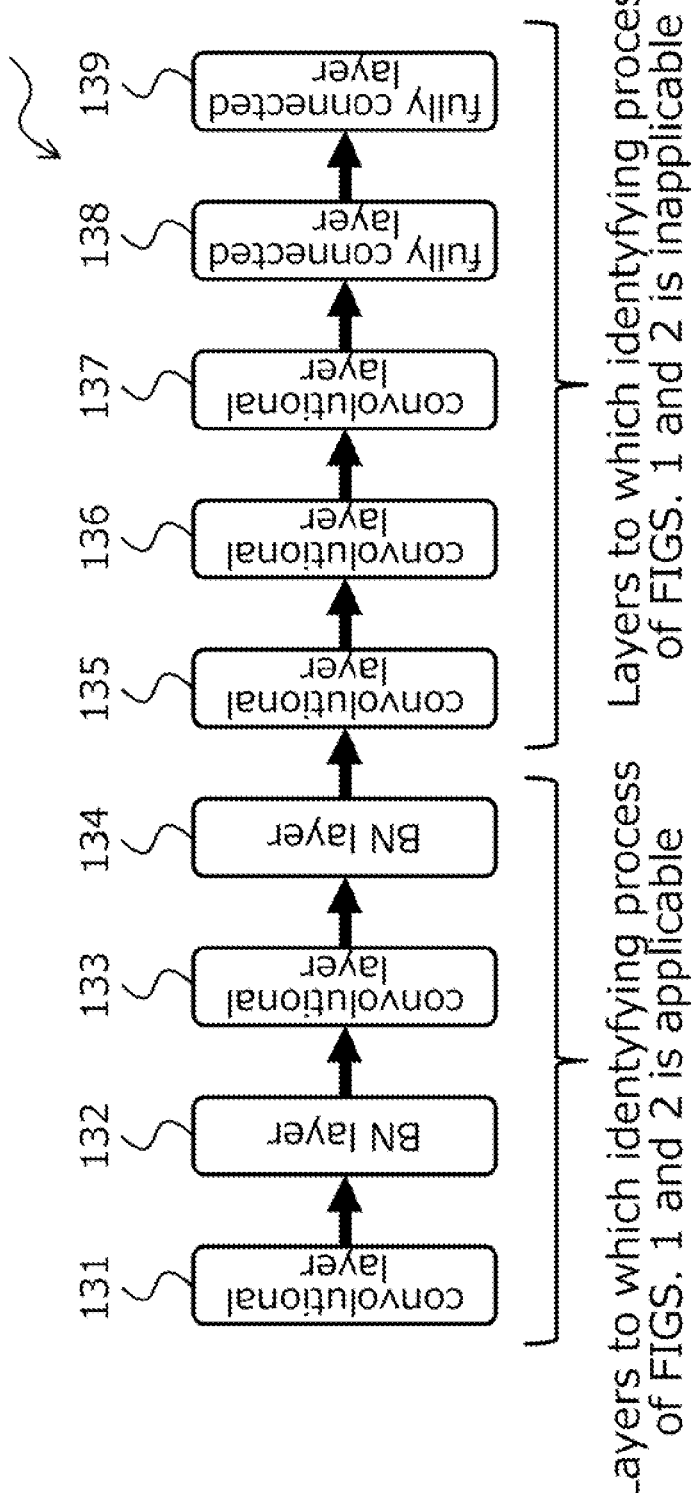
FIG. 3 is a diagram illustrating an example of whether the method of FIGS. 1 and 2 is applicable or inapplicable in layers of an NN.

FIG. 3 is a diagram illustrating an example of whether the method of FIGS. 1 and 2 is applicable or inapplicable in layers 131 to 139 of an NN 130. As depicted in FIG. 3, convolutional layers 131 and 133 and BN layers 132 and 134 are layers to which the L1 regularization learning depicted in FIGS. 1 and 2 is applicable, and convolutional layers 135 to 137 and fully connected layers 138 and 139 are layers to which the L1 regularization learning depicted in FIGS. 1 and 2 is inapplicable.

In view of the above, one embodiment describes a method for realizing downsizing of an NN by determining a pruning rate for each layer regardless of the type of layers.

<1-1> Example of Functional Configuration of Server According to One Embodiment

Figure 4:
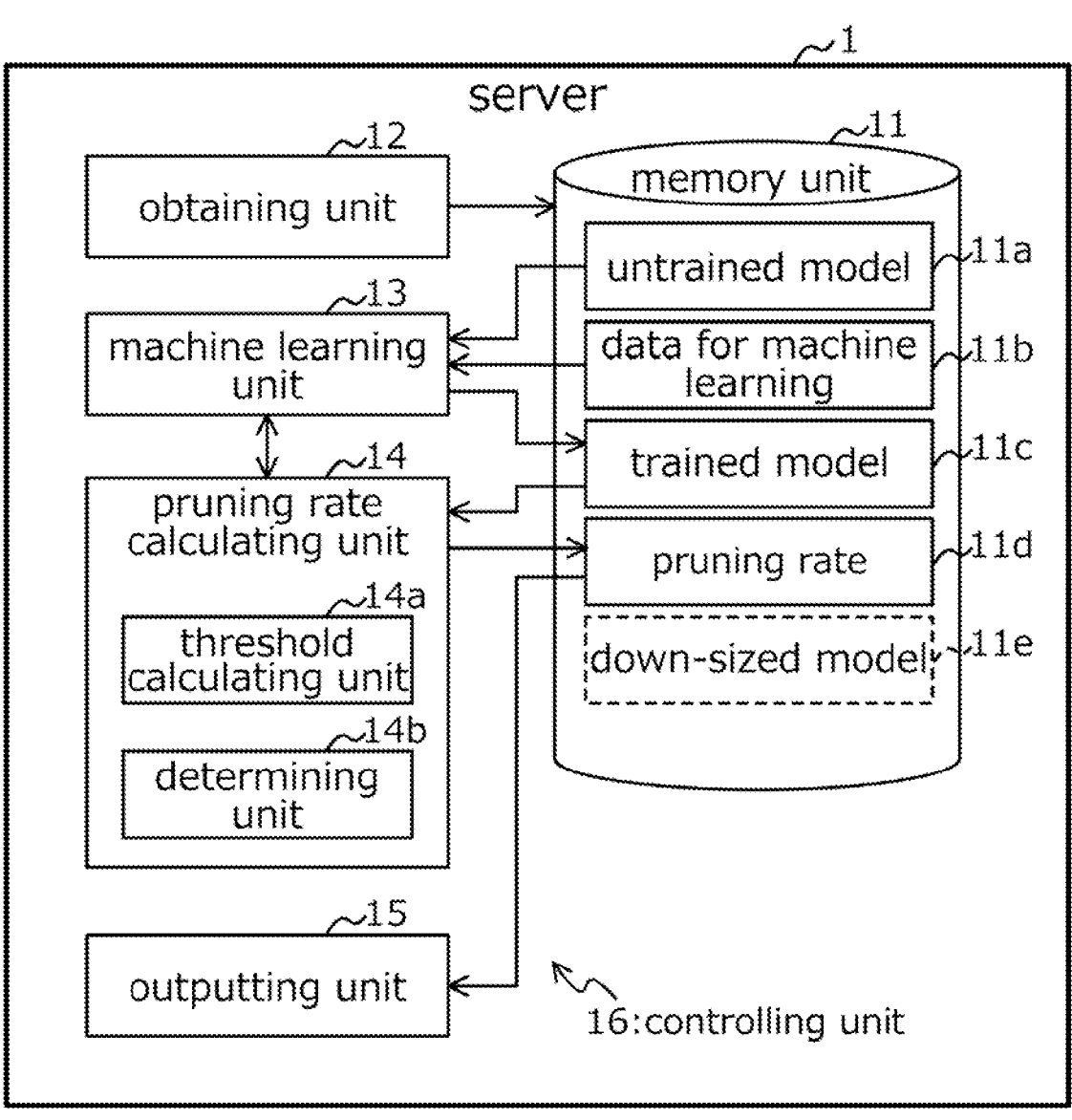
FIG. 4 is a block diagram illustrating an example of a functional configuration of a server according to one embodiment.

FIG. 4 is a block diagram illustrating an example of a functional configuration of a server 1 according to the one embodiment. The server 1 is an example of a calculator, a computer, or an information processing apparatus that outputs the pruning rate. As illustrated in FIG. 4, the server 1 may illustratively include a memory unit 11, an obtaining unit 12, a machine learning unit 13, a pruning rate calculation unit (hereinafter, simply referred to as a "calculation unit") 14, and an outputting unit 15. The obtaining unit 12, the machine learning unit 13, the calculating unit 14, and the outputting unit 15 are examples of a controlling unit 16.

The memory unit 11 is an example of a storage area, and stores various data to be used by the server 1. As illustrated in FIG. 4, the memory unit 11 may be illustratively capable of storing an untrained model 11a, data 11b for machine learning, a trained model 11c, pruning rates 11d, and a down-sized model 11e.

The obtaining unit 12 obtains the untrained model 11a and the data 11b for machine learning, and stores them in the memory unit 11. For example, the obtaining unit 12 may generate one of or both the untrained model 11a and the data 11b for machine learning in the server 1, or may receive them from a computer outside the server 1 via a non-illustrated network.

The untrained model 11a may be a model of the NN including the untrained parameters before machine learning. The NN may include various layers and may be, for example, a DNN (Deep NN). The NN may include, for example, a convolutional layer to which no BN layer is connected or a fully connected layer, or may include a convolutional layer to which a BN layer is connected, and may be, as an example, the NN 130 illustrated in FIG. 3.

The data 11b for machine learning may be, for example, a data set for training to be used for machine learning (training) of the untrained model 11a. For example, when machine learning is performed on an NN for realizing image processing, the data 11b for machine learning may include, for example, multiple pairs of labeled training data that includes training data such as image data and a ground truth label for the training data.

In the machine learning phase, the machine learning unit 13 executes a machine learning process that performs machine learning on the untrained model 11a based on the data 11b for machine learning. For example, the machine learning unit 13 may generate the trained model 11c by the machine learning process of the untrained model 11a. The trained model 11c may be an NN model including a trained parameter(s).

The trained model 11c may be obtained by updating a parameter included in the untrained model 11a, and may be regarded as, for example, a model as a result of a change from the untrained model 11a to the trained model 11c through the machine learning process. The machine learning process may be implemented by various known techniques.

The calculating unit 14 calculates the pruning rates 11d by executing a pruning rate calculation process for the trained model 11c, and stores them into the memory unit 11.

For example, the calculating unit 14 may include a threshold calculating unit 14a that calculates a threshold for selecting one of pruning rate candidates for each layer, and a determining unit 14b that determines, based on inference accuracy of the model pruned at the pruning rate candidates, the pruning rates 11d to be adopted.

The outputting unit 15 outputs output data based on the pruning rates 11d generated (obtained) by the calculating unit 14. The output data may include, for example, the pruning rates 11d themselves, the down-sized model 11e, or both.

The down-sized model 11e is data of a down-sized model of the trained model 11c, which is obtained by execution of pruning on the trained model 11c based on the pruning rates lid. For example, in cooperation with the machine learning unit 13, the outputting unit 15 may acquire the down-sized model 11e by execution of pruning and re-learning on the trained model 11c while applying the pruning rates 11d, and may store the acquired model into the memory unit 11. The down-sized model 11e may be, for example, generated separately from the trained model 11c, or may be the updated data of the trained model 11c obtained through pruning and re-learning.

In outputting the output data, the outputting unit 15 may, for example, transmit (provide) the output data to another non-illustrated computer, or may store the output data into the memory unit 11 and manage the output data to be acquirable from the server 1 or another computer. Alternatively, in outputting the output data, the outputting unit 15 may display information indicating the output data on an output device such as the server 1, or may output the output data in various other manners.

<1-2> Example of Pruning Rate Calculation
Process

Next, an example of the pruning rate calculation process by the calculating unit 14 of the server 1 will be described. In the following description, a calculation target of the pruning rate is assumed to be a weight matrix W which is an example of a parameter of a layer.

The calculating unit 14 determines the pruning rate regardless of the type of layers by using errors in tensors for each layer, which errors are generated by pruning. As an example, the calculating unit 14 may calculate the pruning rate according to the following procedures (i) to (iii).

(i) The calculating unit 14 (threshold calculating unit 14*a*) determines (calculates), for each layer, the pruning rate that can guarantee the accuracy.

The term "guarantee the accuracy" means, for example, to guarantee that accuracy of inference (inference accuracy) using the down-sized model 11*e* obtained by pruning the trained model 11*c* exceeds a predetermined criterion.

Figure 5:
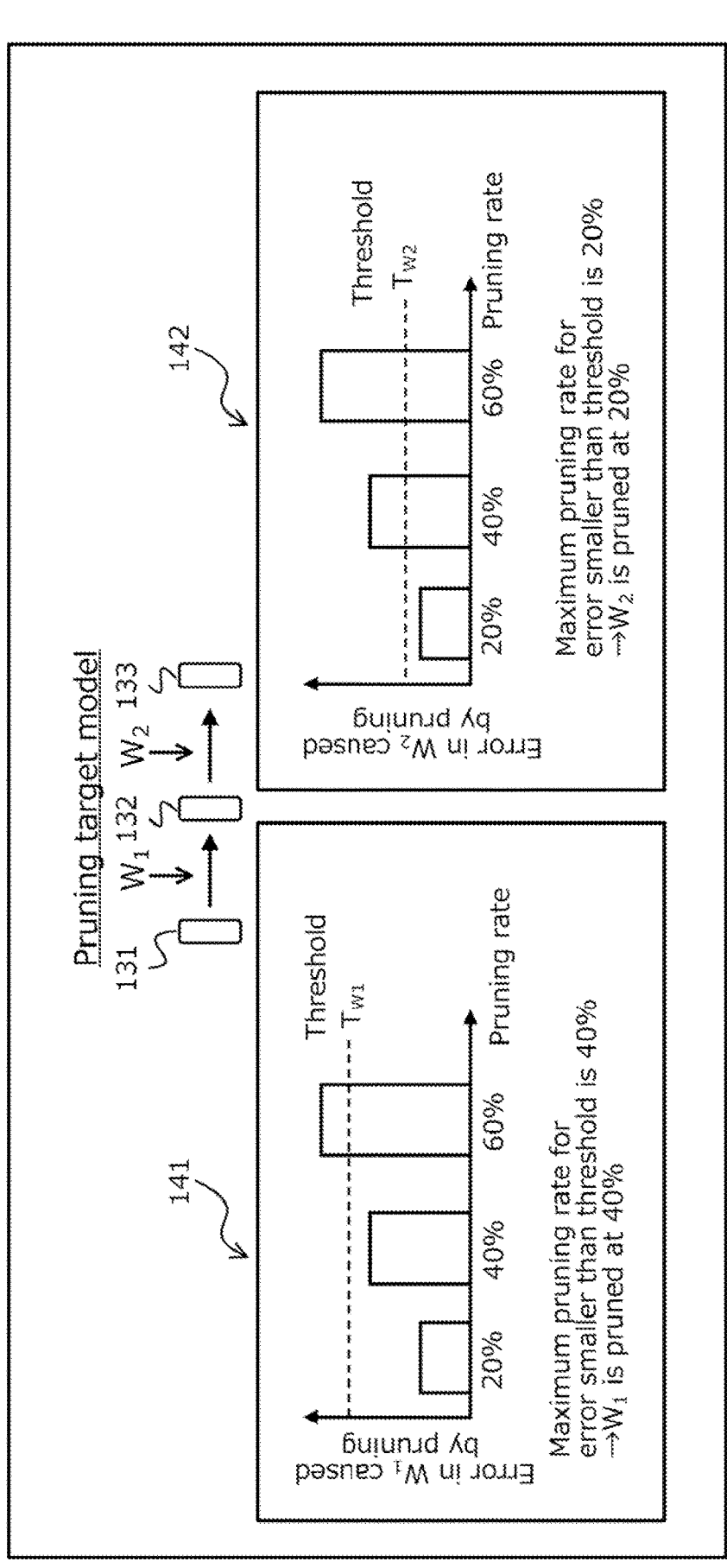
FIG. 5 is a diagram illustrating an example of calculating a pruning rate that can guarantee accuracy.

FIG. 5 is a diagram illustrating an example of calculating the pruning rate that can guarantee the accuracy. As illustrated in FIG. 5, in (i), the threshold calculating unit 14*a* determines, for each weight matrix W of the multiple layers, the pruning rate to be applied to the weight matrix W of each layer included in the trained model 11*c* of the pruning target. Although FIG. 5 focuses on the layers 131 to 133, the application of the description of FIG. 5 is not limited to these, and may be any of the layers 131 to 139 illustrated in FIG. 3.

Here, the pruning rate is an example of a ratio for reducing (reduction ratio) an element(s) of a layer and indicates a ratio for rendering the pruning target in the trained model 11*c* "sparse". In the example of FIG. 2, the pruning rate corresponds to the number of places set as "0" in the vector 123.

As illustrated in FIG. 5, the threshold calculating unit 14*a* selects, for each of the weight matrix $W_1$ of the layer 131 (weight matrix $W_1$ connected to the layer 132) and the weight matrix $W_2$ of the layer 132 (weight matrix $W_2$ connected to the layer 133), one pruning rate from multiple pruning rate candidates. The pruning rate candidates are examples of reduction ratio candidates, and may be, for example, two or more ratios between 0% and 100%, common to multiple layers, different in individual layers, or a combination thereof. In the example of FIG. 5, the pruning rate candidates are assumed to be 0%, 20%, 40%, and 60%.

For example, the threshold calculating unit 14*a* obtains an error in tensors between before and after pruning in cases where the pruning is performed for each pruning rate candidate, and determines the maximum pruning rate candidate among the pruning rate candidates with errors smaller than a threshold $T_W$. In the example of FIG. 5, for $W_1$, the threshold calculating unit 14*a* determines that the maximum pruning rate candidate with an error smaller than a threshold $T_{w1}$ is 40% (see arrow 141). In addition, for $W_2$, the threshold calculating unit 14*a* determines that the maximum pruning rate candidate with an error smaller than a threshold $T_{w2}$ is 20% (see arrow 142).

The threshold $T_w$ is a threshold of the error in the tensors between before and after the pruning, and is an upper limit of the pruning rate that can guarantee the accuracy. For example, the threshold calculating unit 14*a* may calculate the threshold $T_w$ for each layer by expressing the loss function at the time of pruning the pruning target by an approximate expression such as a first-order Taylor expansion. The details of the method for calculating the threshold $T_w$ will be described later.

The pruning rate calculated in (i) may be regarded as a "provisionally calculated" pruning rate in relation to processes of (ii) and (iii).

As described above, the threshold calculating unit 14*a* calculates the thresholds T of the errors in the tensors between before and after the reduction one for each element of the multiple layers in the trained model 11*c* of the NN including the multiple layers. The threshold calculating unit 14*a* selects the reduction ratio candidates to be applied one to each of the multiple layers based on the multiple thresholds T and the errors in the tensors between before and after the reduction in the cases where the elements are reduced by each of the multiple reduction ratio candidates in each of the multiple layers.

(ii) The calculating unit 14 (determining unit 14*b*) determines the pruning rate based on the accuracy of the machine learning model pruned (downsized) by using the pruning rate determined in (i) and the accuracy of the machine learning model that has not undergone pruning.

For example, the determining unit 14*b* considers the error caused by the approximate expression (first-order Taylor expansion), and compares the sum of accuracy $Acc_p$ of the model pruned at the pruning rate determined in (i) for each layer and an accuracy margin $Acc_m$ with accuracy $Acc_{wo}$ of an unpruned model. The accuracy margin $Acc_m$ is a margin for which the inference accuracy is allowed to be degraded, and may be set by a designer. The margin may be "0", and in this case, the determining unit 14*b* may compare the accuracy $Acc_p$ with the accuracy $Acc_{wo}$ of the unpruned model.

Figure 6:
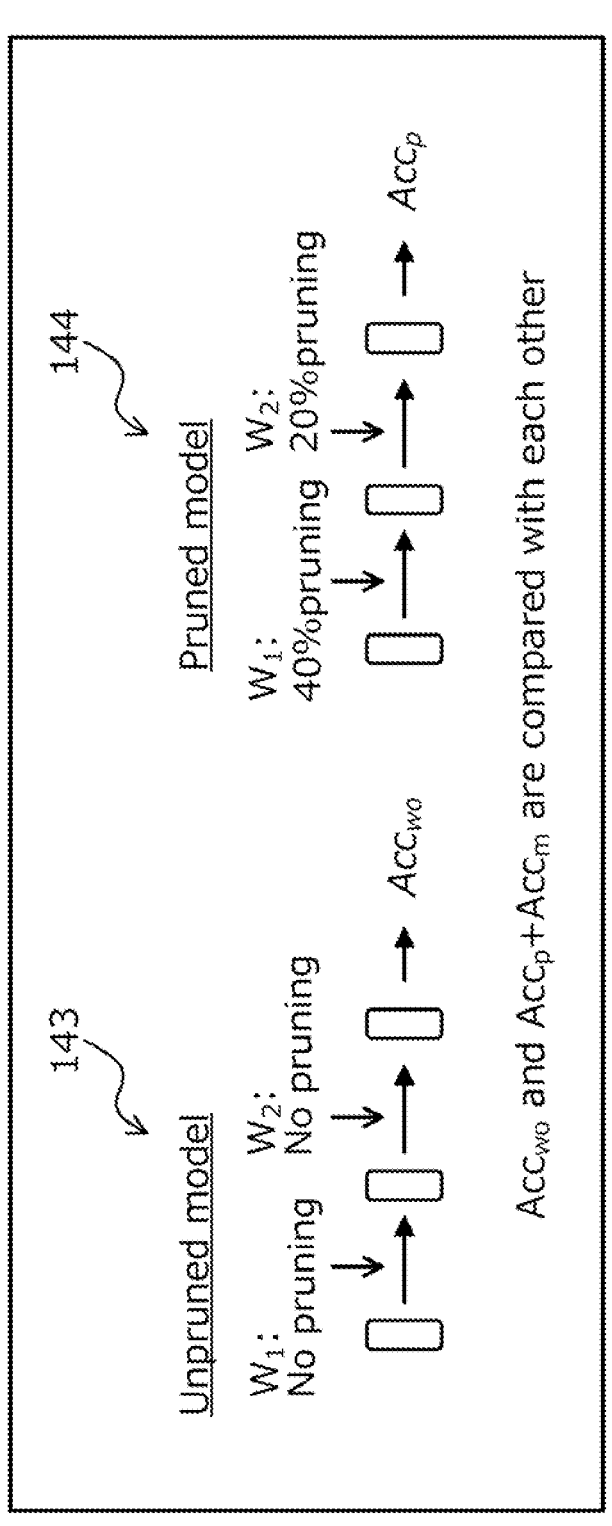
FIG. 6 is a diagram illustrating an example of calculating accuracy of models before and after pruning.

FIG. 6 is a diagram illustrating an example of calculating the accuracy of the model before and after the pruning. For example, the determining unit 14*b* calculates the accuracy $Acc_{wo}$ of the unpruned model (trained model 11*c*) for all layers ($W_1$, $W_2$, . . . ) (see arrow 143). The unpruned model may be regarded as a model that has been pruned at a pruning rate of 0% for each layer. The determining unit 14*b* calculates the accuracy $Acc_p$ of the model that has been pruned at the pruning rate ($W_1$=40%, $W_2$=20%, . . . ) calculated by (i) for each layer (see arrow 144).

If the sum $Acc_p + Acc_m$ of the accuracy is equal to or higher than the accuracy $Acc_{wo}$, the determining unit 14*b* determines to adopt the pruning rates determined in (i). For example, the determining unit 14*b* stores the pruning rates determined in (i) as the pruning rates 11*d* into the memory unit 11.

On the other hand, if the sum $Acc_p + Acc_m$ of the accuracy is lower than the accuracy $Acc_{wo}$, the determining unit 14*b* determines to discard the pruning rates determined in (i). For example, the determining unit 14*b* discards the pruning rates determined in (i) and determines to adopt the pruning rates 11*d* determined in the latest (ii) (or initial pruning rates 11*d*).

(iii) The calculating unit 14 (determining unit 14*b*) repeatedly applies (i) and (ii) multiple times to search for maximum pruning rates that can guarantee the accuracy.

Figure 7:
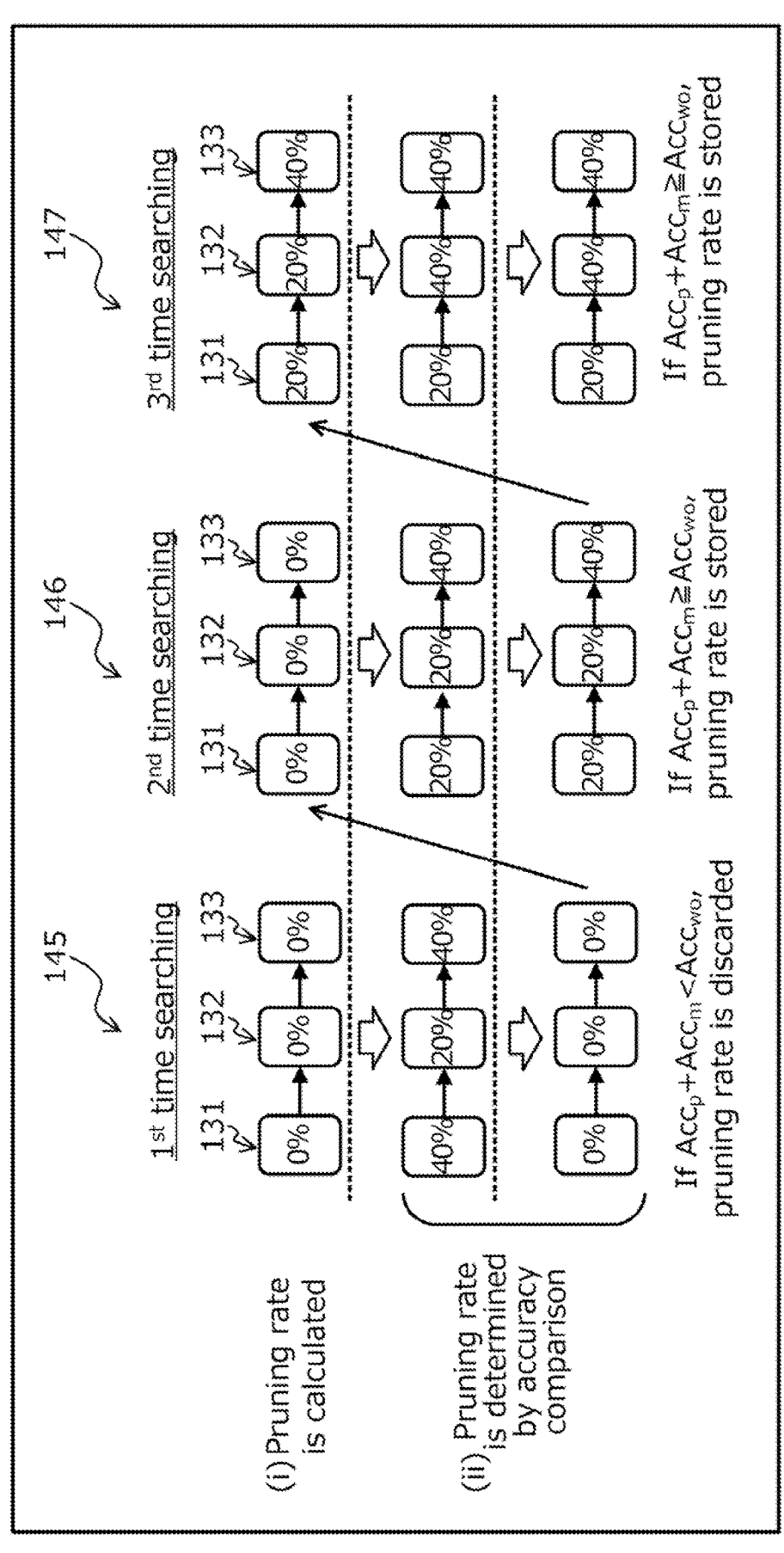
FIG. 7 is a diagram illustrating an example of a search for the pruning rates.

FIG. 7 is a diagram illustrating an example of a search for the pruning rates. The example of FIG. 7 illustrates a case where the calculating unit 14 uses the pruning rates for three layers (131 to 133) three times.

As illustrated in FIG. 7, in the first time searching (see reference numeral 145), in (i), the threshold calculating unit 14*a* is assumed to calculate the threshold $T_w$ and to determine that, based on the threshold $T_w$, the pruning rates for the layers 131 to 133 are to be "40%, 20%, 40%" from "0%, 0%, 0%" (initial values). For example, in (ii), if the determining unit 14*b* determines $Acc_p + Acc_m < Acc_{wo}$ in comparing the inference accuracy, the determining unit 14*b* discards the pruning rates determined in (i) and adopts "0%, 0%, 0%" which are the values before the determination.

In the second time searching (see reference numeral 146), in (i), the threshold calculating unit 14a is assumed to calculate (update) the threshold $T_w$, and to determine that, based on the updated threshold $T_w$, the pruning rates for the layers 131 to 133 are to be "20%, 20%, 40%" from "0%, 0%, 0%". For example, in (ii), if the determining unit 14b determines $Acc_p + Acc_m \geq Acc_{wo}$ in comparing the inference accuracy, the determining unit 14b adopts "20%, 20%, 40%" and stores them as the pruning rates 11d into the memory unit 11.

In the third time searching (see reference numeral 147), in (i), the threshold calculating unit 14a is assumed to calculate (update) the threshold $T_w$ and to determine that, based on the updated threshold $T_w$, the pruning rates for the layers 131 to 133 are to be "20%, 40%, 40%" from "20%, 20%, 40%". For example, in (ii), if the determining unit 14b determines $Acc_p + Acc_m \geq Acc_{wo}$ in comparing the inference accuracy, the determining unit 14b adopts "20%, 40%, 40%" and stores (updates) them as the pruning rates 11d into the memory unit 11.

The determining unit 14b may search for the pruning rates over a predetermined number of times, for example, a preset number of times.

As described above, the determining unit 14b determines the reduction ratios to be applied one to each of the multiple layers based on the inference accuracy of the trained model 11c and the inference accuracy of the reduced model after the machine learning, which is obtained by reducing each element of the multiple layers in the trained model 11c according to the reduction ratio candidates to be applied.

Figure 8:
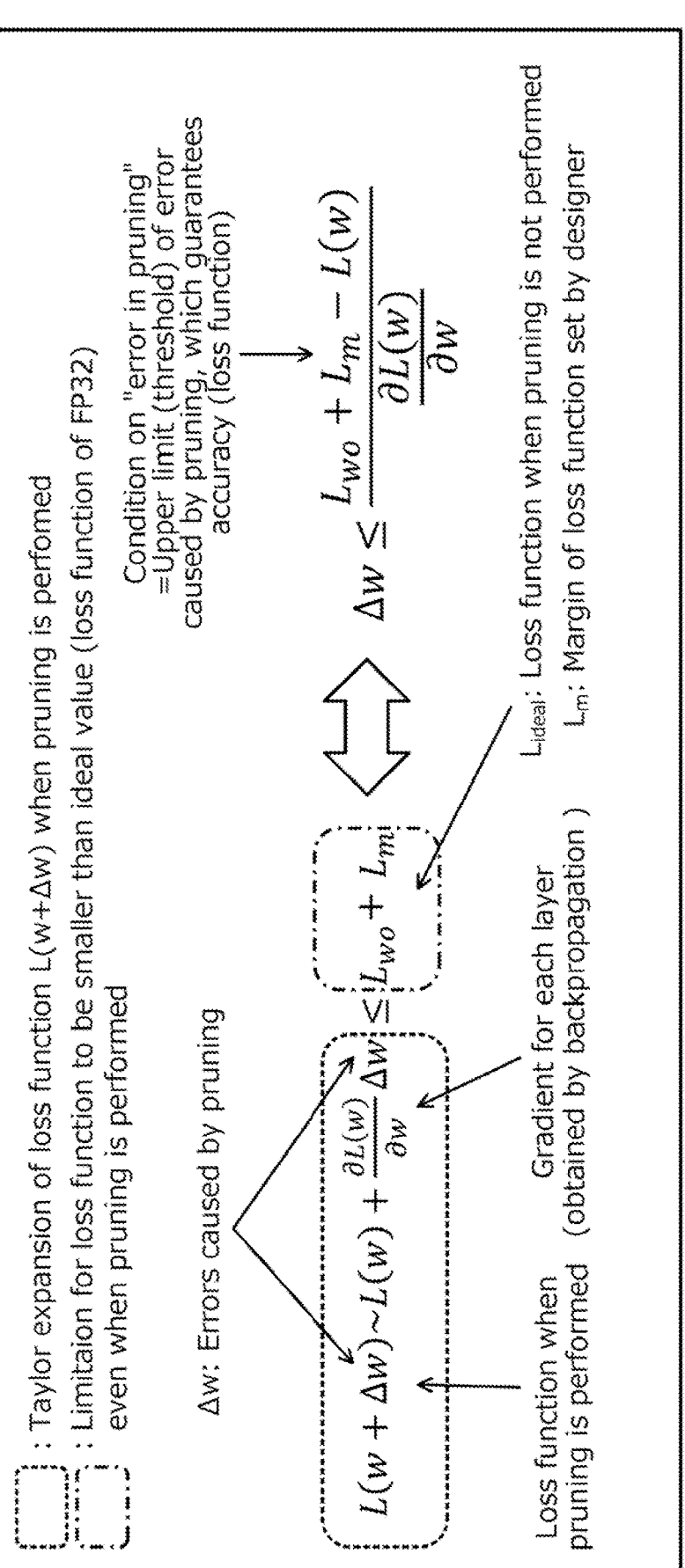
FIG. 8 is a diagram explaining an example of a method for deriving a threshold.
Figure 9:
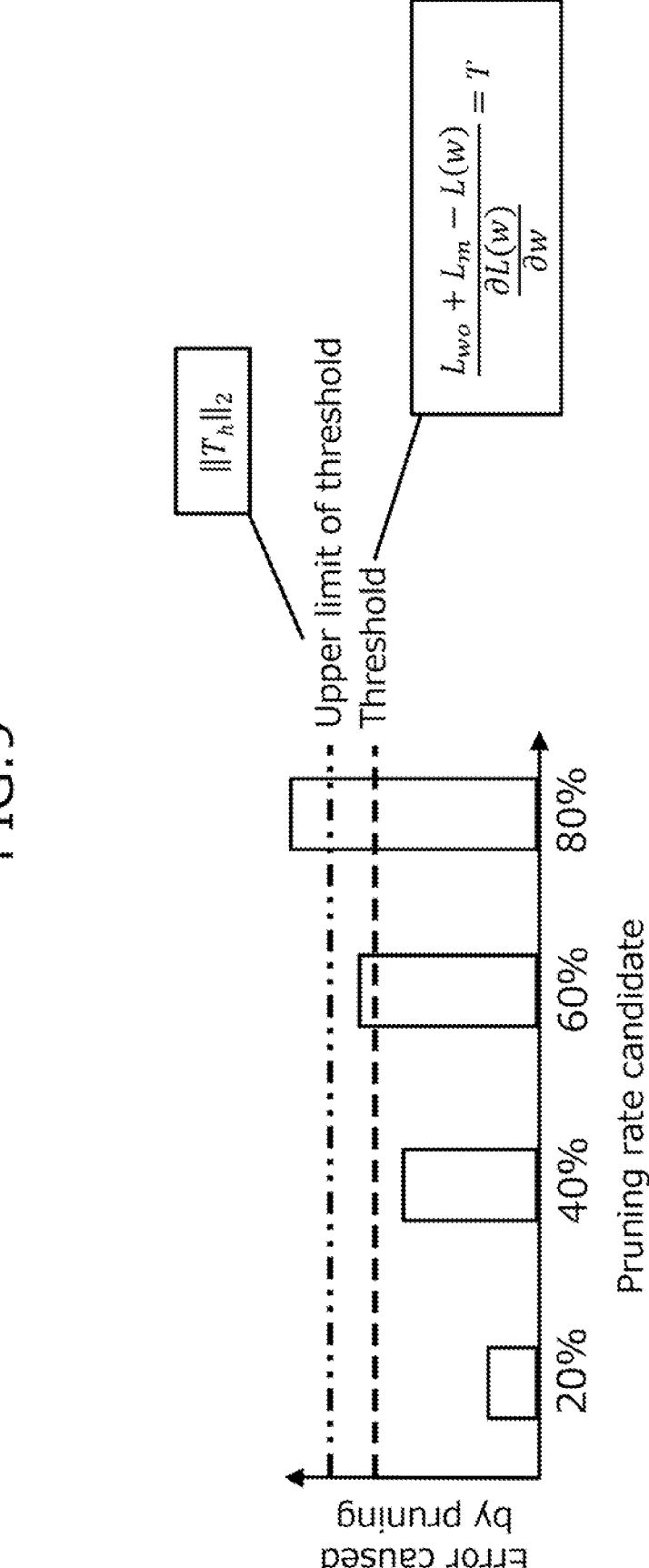
FIG. 9 is a diagram illustrating an example of the threshold and an upper limit of the threshold.

Next, description will be made in relation to a specific example of the pruning rate calculation process described above. FIG. 8 is a diagram explaining an example of a method for deriving a threshold, and FIG. 9 is a diagram illustrating an example of the threshold and the upper limit of the threshold.

The threshold calculating unit 14a performs first-order Taylor expansion on the loss function in the pruning to calculate the threshold of the pruning rate that can guarantee the accuracy for each layer. For example, assuming that: the error in the tensors for each layer, which error is generated by pruning, is $\Delta w$; the loss function in the pruning is $L(w + \Delta w)$; the loss function of the model of the pruning target is $L(w)$; and the loss function ($L_{ideal}$) without the pruning is $L_{wo} + L_m$, the threshold of the pruning rate that can guarantee the accuracy is calculated by the following equation (4). It should be noted that $L_{wo}$ is the loss function of the unpruned model, and $L_m$ is a margin of the loss function set by a designer.

[Equation 4]

$$L(w + \Delta w) \sim L(w) + \frac{\partial L(w)}{\partial w} \Delta w \leq L_{wo} + L_m \tag{4}$$

The left side of the above equation (4) (see the dashed line box in FIG. 8) is the Taylor expansion of the loss function $L(w + \Delta w)$ in the pruning, and includes a weight gradient "∂L(W)/∂w" of each layer of the pruning target. The gradient of each layer may be calculated by backpropagation. The right side of the above equation (4) (see the dash-dot line box in FIG. 8) is a limitation for the loss function to be smaller than an ideal value (for example, the loss function of FP32) even when pruning is performed.

As described above, the threshold calculating unit 14a calculates the thresholds T based on the values of the loss functions of the trained model 11c at the time of reducing elements of each of the multiple layers and the weight gradients of each of the multiple layers.

Rearranging the above equation (4) can derive, as expressed by the following equation (5), a condition of the "error in pruning", which satisfies the limitation for the loss function in the pruning to be smaller than the ideal loss function. In other words, it is possible to derive the upper limit (threshold) of the error caused by the pruning, which guarantees the accuracy (loss function). The threshold calculating unit 14a sets the right side of the following equation (5) to be the threshold T.

[Equation 5]

$$\Delta w \leq \frac{L_{wo} + L_m - L(w)}{\frac{\partial L(w)}{\partial w}} \tag{5}$$

As illustrated in FIG. 9, the threshold calculating unit 14a compares the threshold T set for each layer with the error in the L1 norm caused by the pruning. Then, the threshold calculating unit 14a determines to adopt the pruning rate candidate of the maximum value (40% in the example of FIG. 9) among the pruning rate candidates with errors smaller than the threshold T as the pruning rate resulted by (i).

As an example, in accordance with the following equation (6), the threshold calculating unit 14a may determine, for each layer of the pruning target, the pruning rate that causes a pruning error (left side) to be equal to or smaller than the threshold (right side). In the following equation (6), "$\|\Delta W\|_1$" is the L1 norm of the weight to be regarded as the pruning target and "n" is the number of elements of the weight of the layer in the pruning target.

[Equation 6]

$$\frac{\|\Delta W\|_1}{n} \leq \frac{L_{wo} + L_m - L(W)}{n} \sum_{k=1}^{n} \frac{1}{\left| \frac{\partial L(W)}{\partial w_i} \right|} \tag{6}$$

As illustrated in the above equation (6), the threshold T is to be a parameter derived by approximation. To prevent mistakes in determining the pruning rate due to an approximation error, an upper limit may be set for the threshold T (see FIG. 9). For example, the threshold calculating unit 14a may limit, based on a trust-region method, the magnitude of the threshold T by a "trust radius". The trust radius is an example of a threshold upper limit. As an example, the threshold calculating unit 14a may scale the thresholds T such that an L2 norm of the thresholds T of all layers become equal to or smaller than the trust radius. In the example of FIG. 9, $T_h$ represents a vector according to the threshold T of each layer and "$\|T_h\|_2$" represents the L2 norm of the thresholds T of all layers.

For example, in accordance with the comparison result of the accuracy in the process of (ii) by the determining unit 14b, the threshold calculating unit 14a may update, in addition to the pruning rates, the trust radius (e.g., by multiplying it by a constant factor or the like). The initial value of the trust radius may be set by, for example, a designer or the like.

As an example, if the sum $Acc_p+Acc_m$ of the accuracy is equal to or higher than the accuracy $Acc_{wo}$, the threshold calculating unit 14a may multiply the trust radius by a constant K ("K>1.0"), and if the sum $Acc_p+Acc_m$ of the accuracy is lower than the accuracy $Acc_{wo}$, the threshold calculating unit 14a may multiply the trust radius by a constant k ("0<k<1.0").

<1-3> Explanation According to Type of Pruning Target

Next, description will be made in relation to examples of a method for pruning and a method for calculating the pruning error according to the type of the pruning target. The type of the pruning target may be, for example, channel pruning, node pruning, weight pruning, etc. According to the type of the pruning target, the calculating unit 14 may determine the pruning target and the pruning error by using the weight corresponding to the pruning target.

<1-3-1> Example of Channel Pruning

Figure 10:
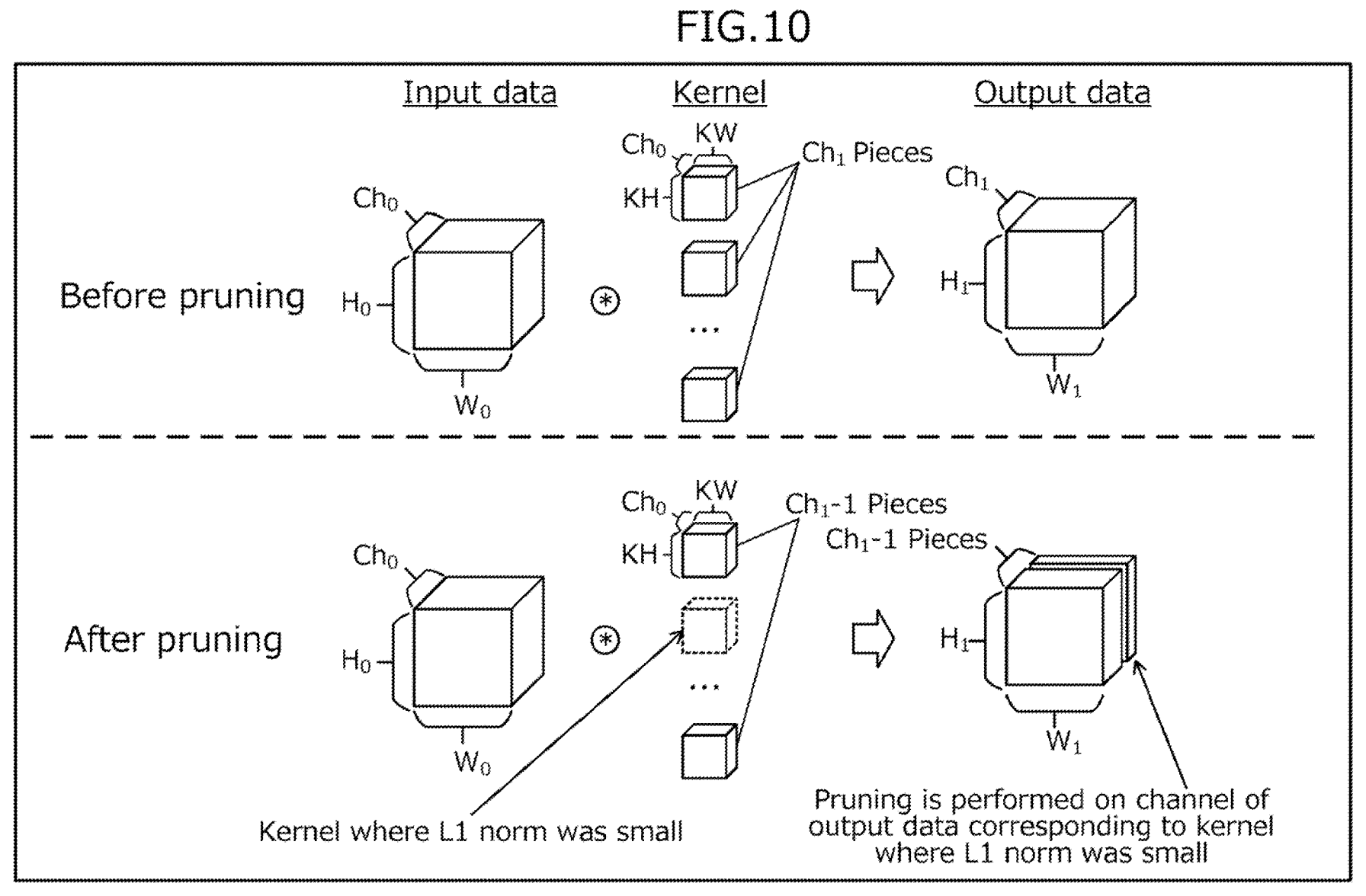
Figure 11:
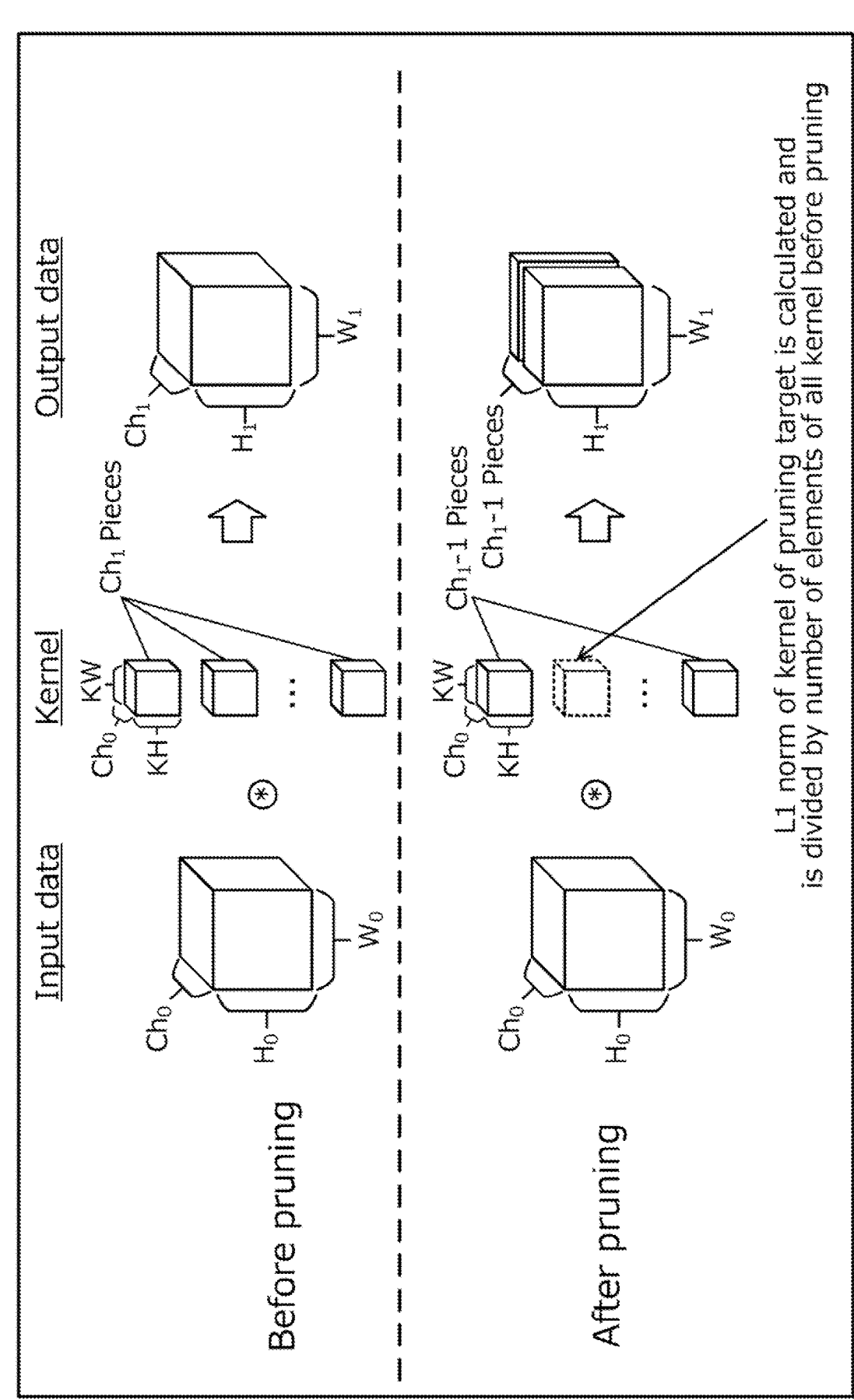
FIG. 11 is a diagram explaining an example of calculating a pruning error.

FIG. 10 is a diagram explaining an example of a method for determining a channel to be pruned and FIG. 11 is a diagram explaining an example of calculating the pruning error.

FIGS. 10 and 11 illustrate process flows of a convolution operation. Subscripted H and W indicate the sizes of input data, kernels, and output data, and subscripted Ch indicates the number of channels of the input data, the kernels, and the output data. Hereinafter, the same applies to the description of other type of pruning target.

(Example of Method for Determining Channel to be Pruned)

When the type of the pruning target is the channel, the calculating unit 14 calculates the L1 norm in units of kernels corresponding to the channels of the output data. For example, the calculating unit 14 calculates, as illustrated by "before pruning" in FIG. 10, the respective L1 norms for all of $Ch_1$ kernels before the pruning. As a result, $Ch_1$ L1 norms are calculated.

Next, as illustrated by "after pruning" in FIG. 10, the calculating unit 14 prunes the channel of the corresponding output data according to the set pruning rate in ascending order of the calculated L1 norms.

(Example of Calculating Pruning Error)

As illustrated in FIG. 11, the calculating unit 14 calculates the L1 norm of the kernel of the pruning target. The L1 norm of the kernel of the pruning target is the value obtained by subtracting the L1 norms of all kernels after pruning from the L1 norms of all kernels before pruning, that is, the difference in the L1 norms between before and after the pruning.

The calculating unit 14 may obtain the pruning error by dividing the calculated L1 norm by the number of elements of all kernels before the pruning.

<1-3-2> Example of Node Pruning

Figure 12:
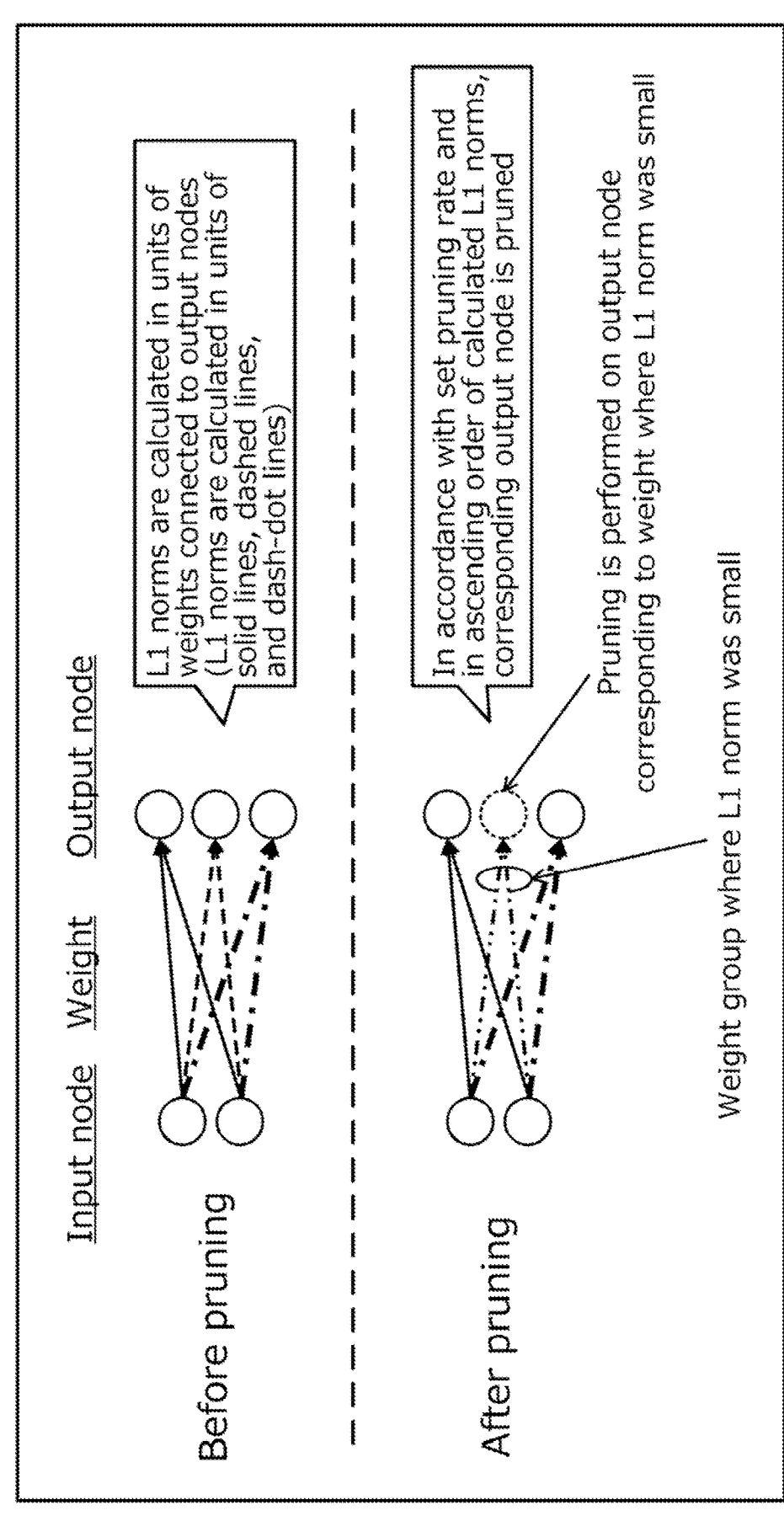
FIG. 12 is a diagram explaining an example of a method for determining a node to be pruned.
Figure 13:
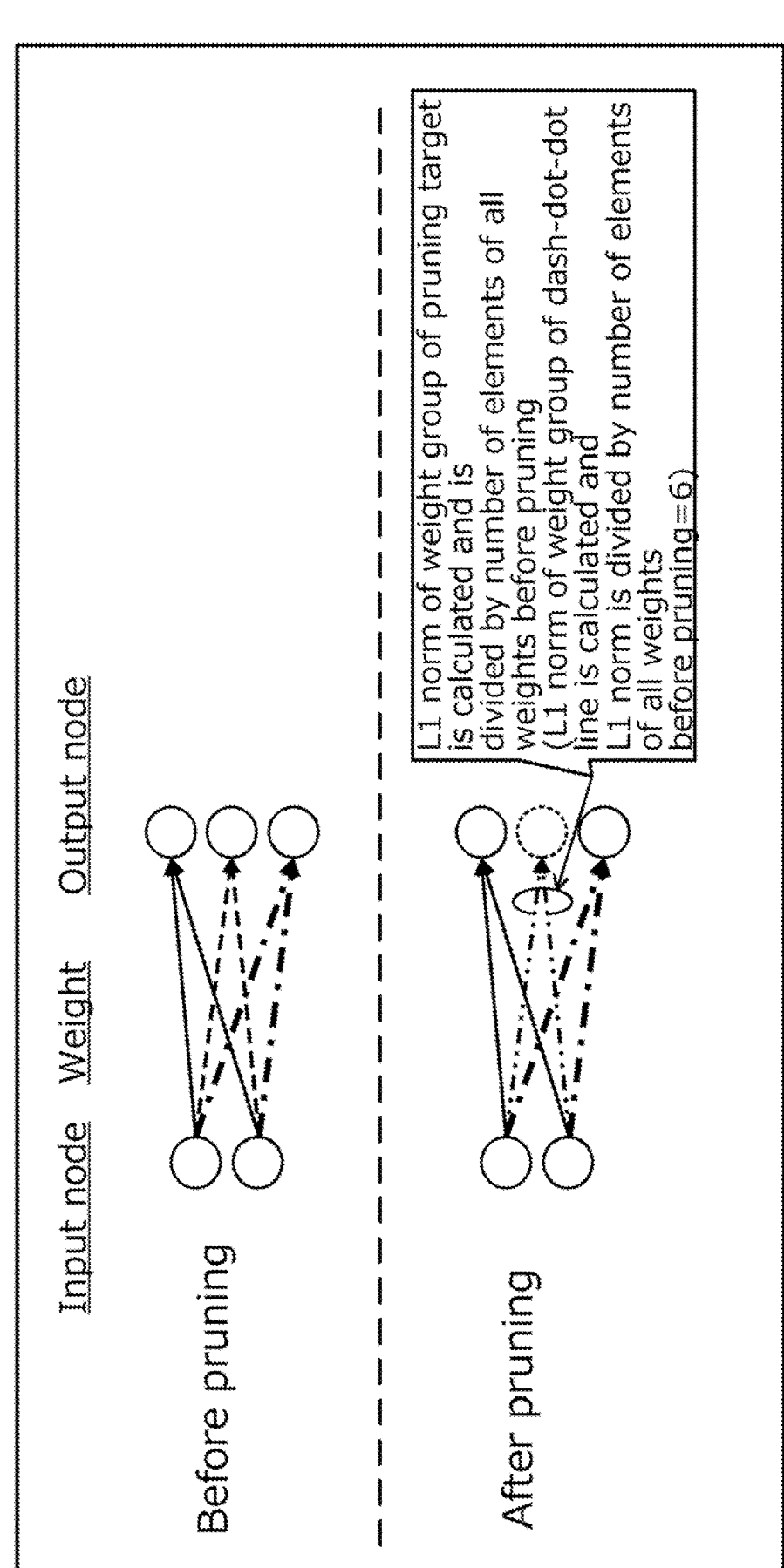
FIG. 13 is a diagram explaining an example of calculating a pruning error.

FIG. 12 is a diagram explaining an example of a method for determining the node to be pruned and FIG. 13 is a diagram explaining an example of calculating the pruning error.

(Example of Method for Determining Node to be Pruned)

When the type of the pruning target is the node, the calculating unit 14 calculates the L1 norm in units of weights connected to the output node. In the example of "before pruning" in FIG. 12, the calculating unit 14 calculates the L1 norm in each unit of solid lines, dashed lines, and dash-dot lines.

Next, as illustrated by "after pruning" in FIG. 12, the calculating unit 14 prunes the corresponding output node according to the set pruning rate in ascending order of the calculated L1 norms. For example, the calculating unit 14 determines that the output node corresponding to a weight group where the L1 norm was small is the node of the pruning target.

(Example of Calculating Pruning Error)

As illustrated in FIG. 13, the calculating unit 14 calculates the L1 norm of the weight group of the pruning target. The L1 norm of the weight group of the pruning target is obtained by subtracting the L1 norms of all weights after the pruning from the L1 norms of all weights before the pruning.

The calculating unit 14 may acquire the pruning error by dividing the calculated L1 norm by the number of elements of all weights before the pruning. In the example of "after pruning" in FIG. 13, the calculating unit 14 calculates the L1 norm of the weight group indicated by the dash-dot-dot line and divides the L1 norm by the number of elements (="6"; the number of lines) of all weights before the pruning.

<1-3-3> Example of Weight Pruning

Figure 14:
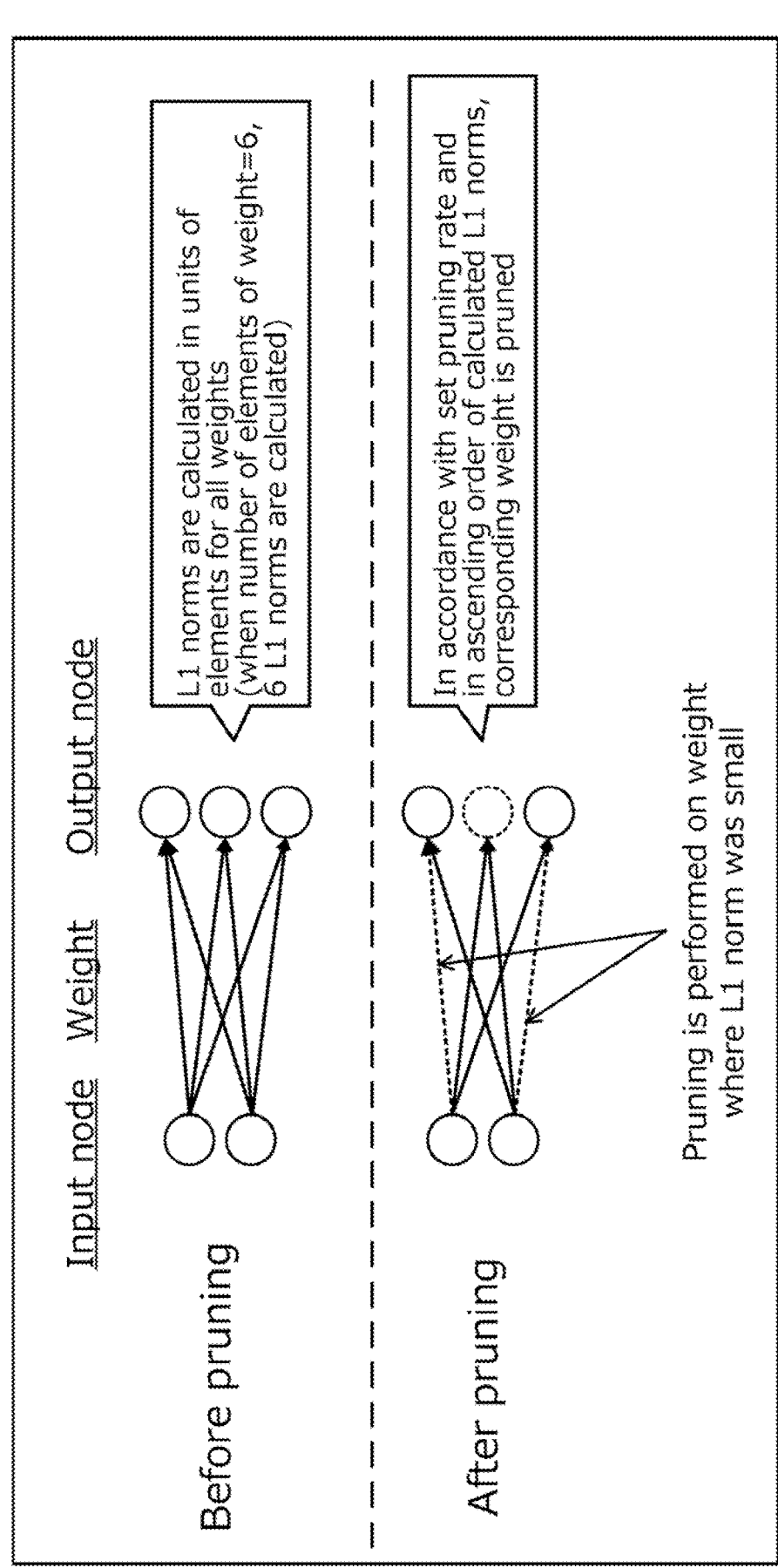
FIG. 14 is a diagram explaining an example of a method for determining a weight to be pruned.
Figure 15:
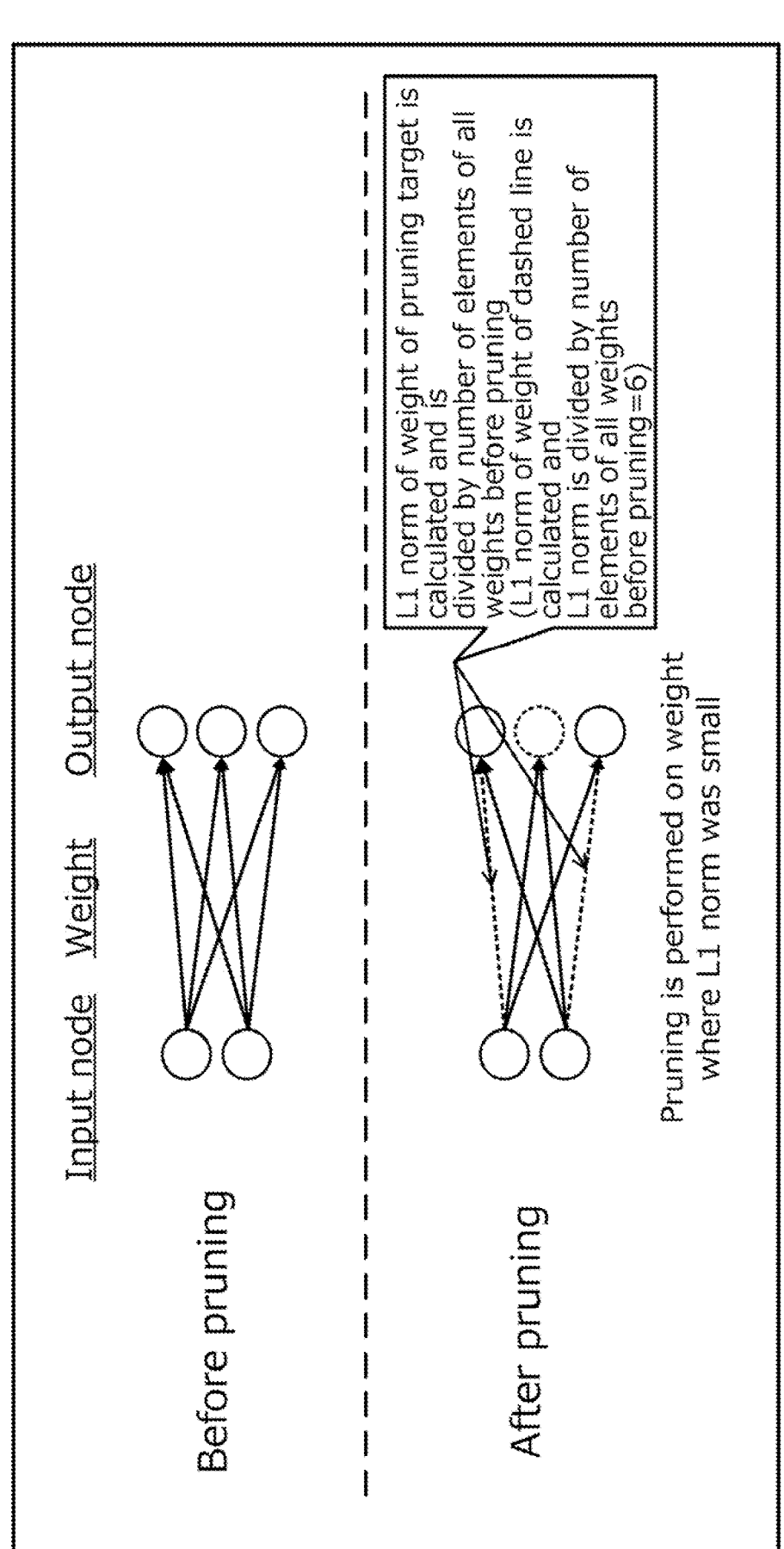
FIG. 15 is a diagram explaining an example of calculating a pruning error.

FIG. 14 is a diagram illustrating an example of a method for determining a weight to be pruned and FIG. 15 is a diagram illustrating an example of calculating the pruning error.

(Example of Method for Determining Weight to be Pruned)

When the type of the pruning target is the weight, the calculating unit 14 calculates the L1 norms for all of the weights in units of elements. In the example of "before pruning" in FIG. 14, since the number of elements of the weight is "6", the calculating unit 14 calculates "6" L1 norms.

Next, as illustrated by "after pruning" in FIG. 14, the calculating unit 14 prunes the corresponding weight according to the set pruning rate in ascending order of the calculated L1 norms. For example, the calculating unit 14 determines that the weight where L1 norm was small is the weight to be pruned.

(Example of Calculating Pruning Error)

As illustrated in FIG. 15, the calculating unit 14 calculates the L1 norm of the weight of the pruning target. The L1 norm of the weight of the pruning target is obtained by subtracting the L1 norms of all weights after the pruning from the L1 norms of all weights before the pruning.

The calculating unit 14 may acquire the pruning error by dividing the calculated L1 norm by the number of elements of all weights before the pruning. In the example of "after pruning" in FIG. 15, the calculating unit 14 calculates the L1 norm of the weight indicated by the dashed line and divides the L1 norm by the number of elements (="6"; the number of lines) of all weights before the pruning.

<1-4> Pruning Process of NN Including Concat Unit

Figure 16:
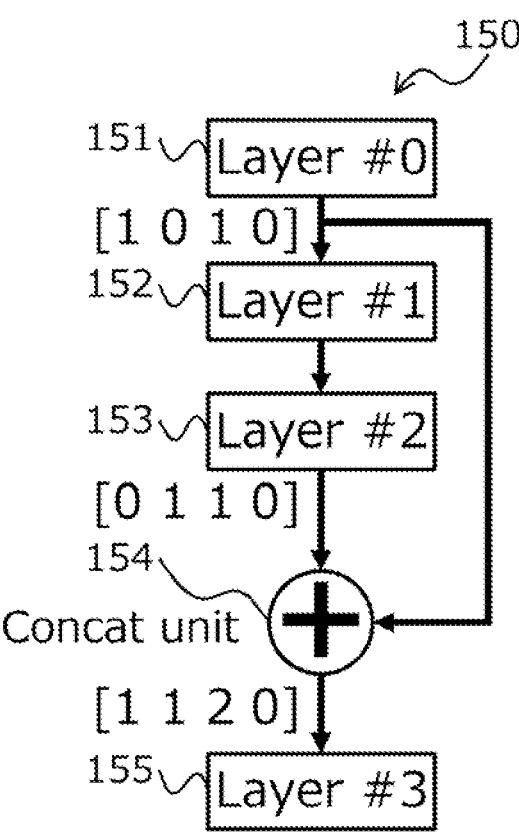
FIG. 16 is a diagram illustrating an example of a NN including a concat unit.

FIG. 16 is a diagram illustrating an example of a NN 150 including a concat unit 154 and FIG. 17 is a diagram illustrating tensors before and after a scheme according to the one embodiment is applied to the NN 150 including the concat unit 154.

As illustrated in FIG. 16, the NN 150 includes layers 151-153 and 155 (respectively denoted by layers #0 to #3), and the concat unit 154. The concat unit 154 adds tensors from the layer #0 and #2, using these tensors as inputs, and outputs the result of the addition to the layer #3. The concat operation is an example of an arithmetic operation that outputs a tensor serving as a result of the arithmetic operation performed on a tensor from the layer #0 and a tensor from the layer #2.

For simplification, the following description assumes that an element of the target of pruning is a channel and the layers #0 and #2 each output a one-dimensional tensor having four channels (i.e., the element number is "4"). Alternative to a channel, the element may be a weight or a node.

In the example of FIG. 16, the concat unit 154 adds a tensor (1010) (square brackets indicating tensor in FIGS. 16 and 17 are replaced with parentheses in the specification) output from the layer #0 and a tensor (0110) output from the layer #2 for each channel, and outputs a tensor (1120), which is the result of the addition, to the layer #3. Each column in a tensor corresponds to an element (e.g., channel) of a target of pruning.

Here, as a result of applying the above-described scheme of the one embodiment to the NN 150 illustrated in FIG. 16, the respective pruning rates of the layers #0 to #3 are determined, and then the layers #0 to #3 are pruned at the respective determined pruning rates.

For example, as illustrated in FIG. 17, the description assumes a case where a tensor output from the layer #0 becomes (10) after the pruning and the tensor output from the layer #3 becomes (010) after the pruning. In this case, since the number "2" of elements (tensor size) of a tensor input from the layer #0 is different from "3", that of a tensor input from the layer #3, the concat unit 154 cannot carry out the concat operation.

For example, one of the solution to avoid such a situation where a concat operation cannot be performed, all the layers that output tensors that are to serve as inputs into a concat operation are uniformly excluded from targets of determining the pruning rates. However, in this situation, as the number of concat units 154 included in a NN increases, the pruning rate of the overall machine learning model of the NN lowers, so that the effect brought by compression (size reduction) of the data size of the machine learning model by means of pruning lowers.

Considering the above, the calculating unit 14 of the one embodiment makes the number (size) of elements, exemplified by the number of channels, of individual layers (hereinafter referred to as "layers just before concat") that are to input tensors into the same concat unit 154 match. For example, the calculating unit 14 may adjust the pruning rates such that the respective numbers of channels of the layers just before concat come to match by applying the following conditions (I) and (II) to the provisionally calculated pruning rates.

(I) Pruning elements (e.g., channels) to be pruned commonly in all the layers just before concat.

(II) Not pruning an element (e.g., channel) not to be pruned in at least one layer just before concat.

This makes it possible to make the respective numbers (sizes) of elements of a tensor input from multiple layers just before concat the same. Accordingly, it is possible to enhance the possibility that layers just before concat are pruned, so that the compression ratio of the data size of a machine learning model can be enhanced by pruning.

Figure 18:
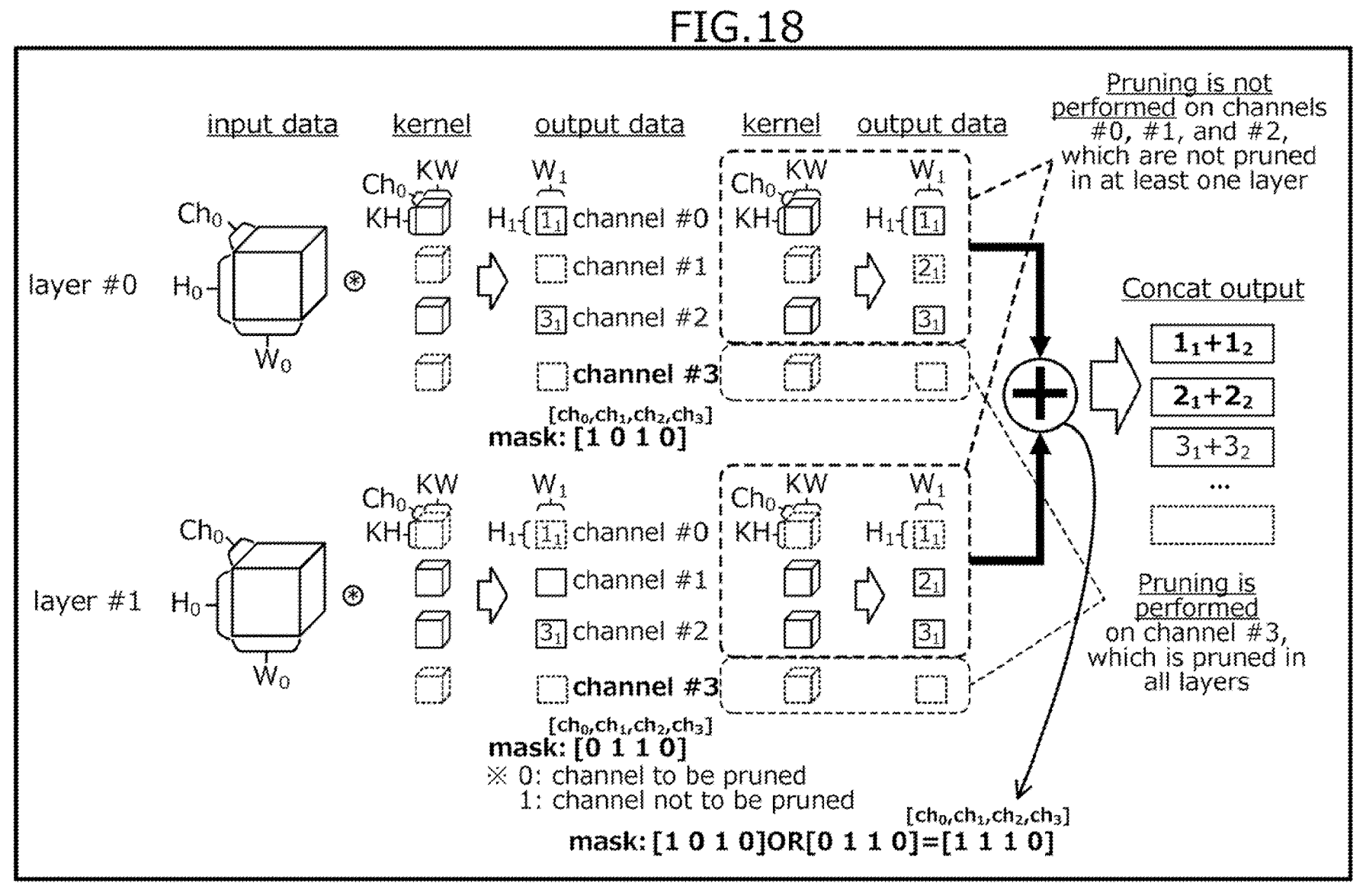

FIG. 18 is a diagram illustrating an example of operation of the calculating unit 14 on a NN including the concat unit 154. For example, FIG. 18 illustrates an example of a process performed on the layer #0 and the layer #1 serving as layers just before concat by the calculating unit 14.

The process illustrated in FIG. 18 may be carried out, selecting pruning rate candidates in cases where a NN of the target of pruning includes the concat unit 154, and may prohibit the carrying out of the process in cases where the NN does not include the concat unit 154. For example, the calculating unit 14 may determine whether or not the NN includes the concat unit 154 with reference to configuration information (not illustrated) that defines the configuration of the NN which is exemplified by the configuration of each layer and connection relationship among the layers. The calculating unit 14 may specify a layer just before concat for each concat unit 154 on the basis of the configuration information.

In FIG. 18, subscripted "H" and "W" indicate sizes of input data, kernel, and output data, and subscripted "Ch" indicates the number of channels of the input data, the kernel, or the output data. The same is applied to the following description.

FIG. 18 describes an example in which the calculating unit 14 calculates an L1 norm in units of kernel corresponding to a channel of output data in the above-described procedure (i), and the pruning rates are provisionally calculated in the L1 regularization learning (see FIG. 2) or the like. For example, when the provisionally calculated pruning rates of two layers are both 50%, the calculating unit 14 prunes two out of four channels of each of the layers #0 and #1.

The example of FIG. 18 assumes that the calculating unit 14 determines (provisionally sets) the channels #1 and #3 of the layer #0 (see upper part of FIG. 18) and the channels #0 and #3 of the layer #1 (see the lower part of FIG. 18) to be the targets of pruning.

The calculating unit 14 determines whether or not the layers #0 and #1 satisfy the above condition (I) or (II) for each target, exemplified by each channel, of pruning of layers #0 and #1. One of the manners of the determination is OR operation using a mask.

For example, the calculating unit 14 may generate a mask that indicates a channel to be pruned with "0" and a channel not to be pruned with "1" for each layer just before concat. In the example of FIG. 18, the calculating unit 14 generates a mask (1010) (square brackets indicating mask in FIG. 18 are replaced with parentheses in the specification) for layer #0 and a mask (0110) for layer #1.

Then the calculating unit 14 carries out an OR operation on the masks of the layers just before concat and specifies a channel having an OR operation result of "0" and a channel having an OR operation result of "1". A channel having an OR operation result of "0" is a channel that is to be commonly pruned in all the layers just before concat, and is an element that satisfies the above condition (I). A channel having an OR operation result of "1" is a channel that is not to be pruned in at least one layer just before concat, and is an element that satisfies the above condition (II).

In the example of FIG. 18, the 14 carries out OR operation on the mask (1010) of layer #0 and the mask (0110) of the layer #1 and thereby obtains the OR operation result (1110). Consequently, the calculating unit 14 determines the channel #3 having a value "0" to be pruned in the layers #0 and #1, and determines the channels #0, #1 and #2 each having a value "1" not to be pruned (i.e., to be excluded from the elements of the targets of pruning). For example, if the output data of the channels #0 to #2 of the layer #0 are "11", "21", and "31" and the output data of the channels #0 to #2 of the layer #1 are "12", "22", and "32", the output of the concat operation when the channel #3 is not pruned is expressed below.

$$\text{concat output} = [1_1 + 1_2, 2_1 + 2_2, 3_1 + 3_2]$$

As the above, if the NN includes the concat unit 154, the calculating unit 14 updates the provisionally calculated pruning rates and the elements of the targets of pruning of the layers just before concat on the basis of the comparison the targets of pruning between the layers just before concat. This means that the calculating unit 14 adjusts the first and one or more second reduction ratios on the basis of one or more elements to be reduced in a first layer among the layers just before concat based on the first reduction ratio and one or more elements to be reduced in one or more second layers among the layers just before concat based on the one or more second reduction ratios.

This makes the numbers of output channels of the layers just before concat linked to the concat unit 154 to match, so that the possibility that at least one of the channels of the layers just before the concat can be pruned is enhanced. In other words, since appropriate pruning rates of the layers just before concat linked to the concat unit 154 can be determined, the compression ratio of the NN including the concat unit 154 can be enhanced.

The process illustrated in FIG. 18 may be part of the procedure (i) performed by a threshold calculating unit 14*a*. In other words, the process illustrated in FIG. 18 may be carried output by the threshold calculating unit 14*a*.

The process performed by the calculating unit 14 after the execution of the process described with reference to FIG. 18 is the same as the procedures (ii) and (iii).

Figure 19:
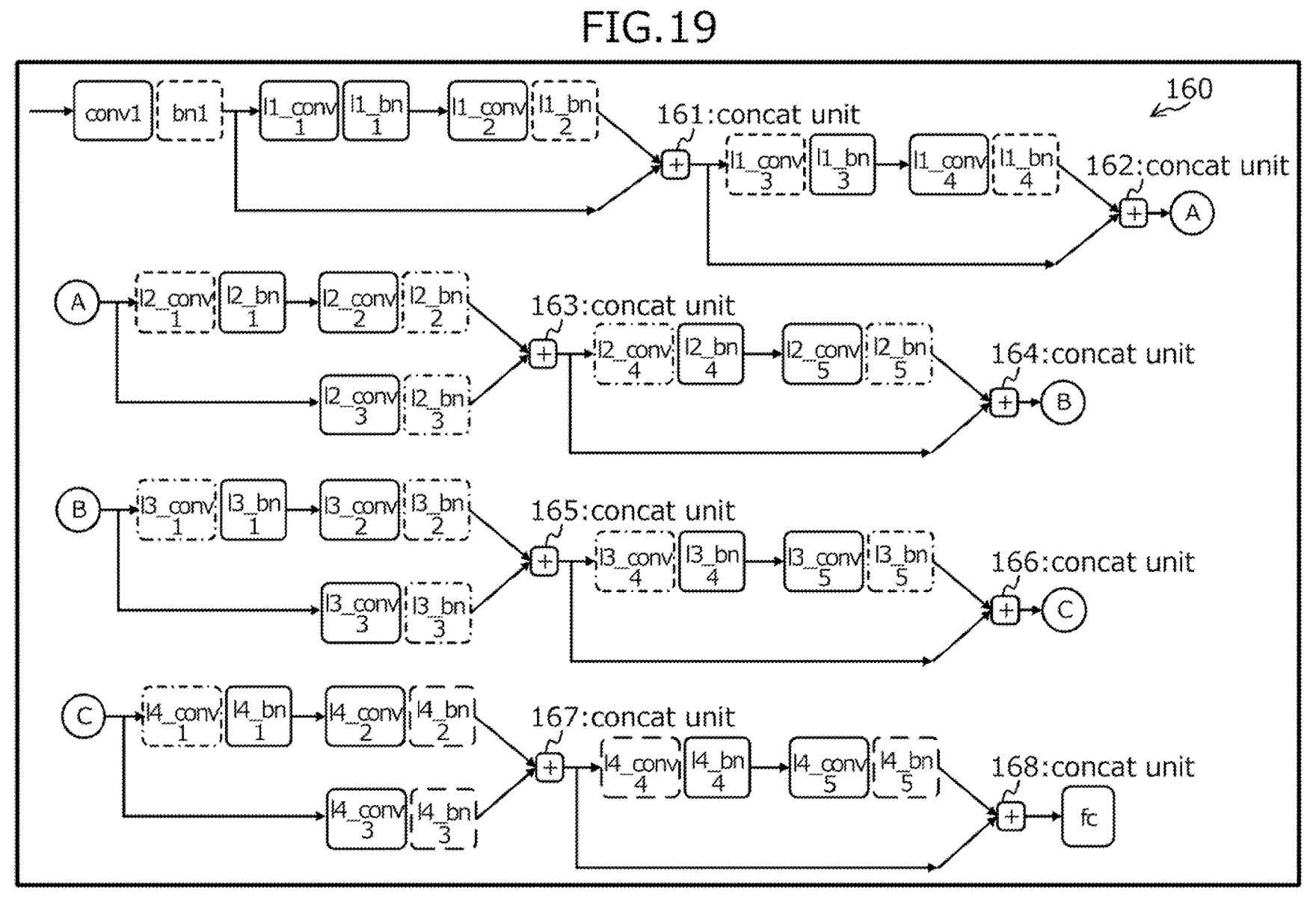

FIG. 19 is a diagram illustrating an example of a NN 160 including multiple concat units 161 to 168. In FIG. 19. FIG. 19 illustrates an example that uses "CIFAR-10" as the data set of the data 11*b* for machine learning and "ResNet-18" having the configuration illustrated in FIG. 19 as the untrained model 11*a* and the trained model 11*c*.

In the example of FIG. 19, the arrows indicate directions of data (tensor) flow in the NN 160. The term "cony" represents a convolutional layer, the term "bn" represents a BN layer, and the term "fc" represents a fully connected layer. Further, the suffixes "l1" to "l4" attached to the heads of the respective layers represent groups of the respective layers and the suffixes "1" to "5" attached to the tails of the respective layers are the identifiers of the layers.

In cases where the method for determining the pruning rates 11*d* according to the one embodiment is applied to the NN 160 illustrated in FIG. 19, the calculating unit 14 causes the concat units 161-168 to each have the same number of output channels among the layers just before concat.

For example, the calculating unit 14 adjusts the pruning rates and the number of channels for the concat unit 161 such that the respective layers of "bn1", "l1_bn2", and "l1_conv3" indicated by dashed lines in FIG. 19 have the same number of output channels. The output of the concat unit 161 is shortcut-concatenated to the concat unit 162. Accordingly, the calculating unit 14 adjusts the pruning rates and the number of channels for the concat unit 162 such that the respective layers of "bn1", "l1_bn2", "l1_bn4", and "l2_conv1" indicated by dashed lines in FIG. 19 have the same number of output channels.

Likewise, the calculating unit 14 adjusts the pruning rates and the number of channels for the concat units 163 and 164 such that the respective layers of "l2_bn2", "l2_bn3", "l1_conv4", "l2_bn5", and "l3_conv1" indicated by dash-dot lines have the same number of output channels. Further, the calculating unit 14 adjusts the pruning rates and the number of channels for the concat units 165 and 166 such that the respective layers of "l3_bn2", "l3_bn3", "l3_conv4", "l3_bn5", and "l4_conv1" indicated by dash-dash-dot lines have the same number of output channels.

Furthermore, the calculating unit 14 adjusts the pruning rates and the number of channels for the concat units 167 and 168 such that the respective layers of "l4_bn2", "l4_bn3", "l4_conv4", and "l4_bn5" indicated by long-dash lines have the same number of output channels.

In the example of FIG. 19, pruning the last layer (FC) may make classification impossible, the calculating unit 14 may exclude the last layer from the targets of pruning.

FIG. 20 is a diagram illustrating an example of accuracy before and after pruning and a compression rate of the data size of the NN 160 of FIG. 19 in cases where conditions (I) and (II) are applied and not applied. In FIG. 20, the cases where conditions (I) and (II) are not applied means excluding the layers just before concat of the concat units 161 to 168 from the targets of pruning.

As illustrated in FIG. 20, when the conditions (I) and (II) are applied, pruning can be carried out on multiple layers that are to serve as inputs into the concat units 161-168. This can improve the compression rate of the data size of the down-sized model 11*e* by about "12.3%" as compared with a case where the conditions (I) and (II) are not applied, inhibiting large deterioration of the accuracy.

<1-5> Operation Example

Figure 21:
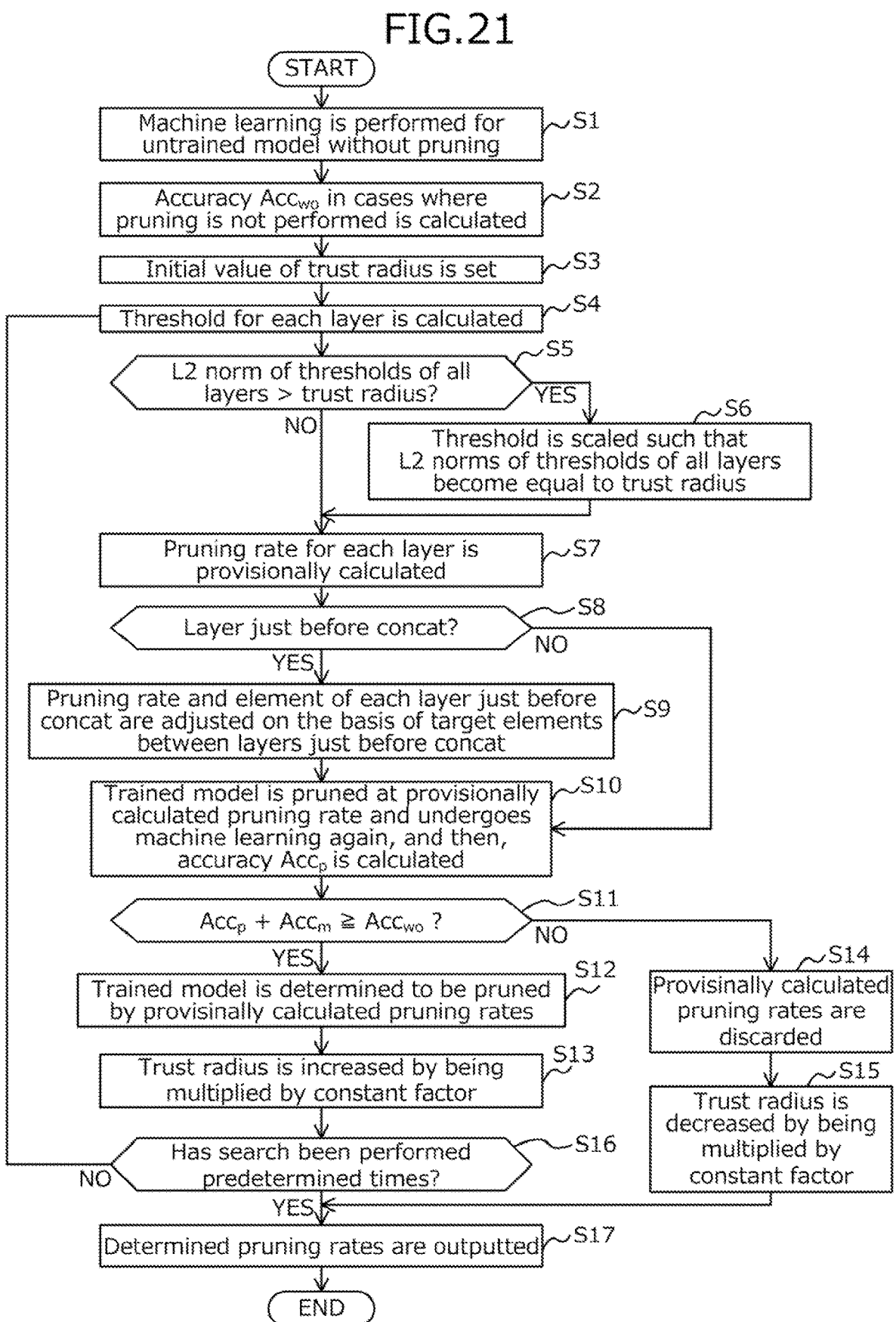
FIG. 21 is a flowchart for explaining an operation example of processes by the server according to the one embodiment.

Next, with reference to FIG. 21, an operation example of the server 1 according to the one embodiment will be described. FIG. 21 is a flowchart for explaining an operation example of processes by the server 1 according to the one embodiment.

As illustrated in FIG. 21, in Step S1, the machine learning unit 13 executes the machine learning on the untrained model 11*a* obtained by the obtaining unit 12 without pruning.

The calculating unit 14 calculates the inference accuracy (recognition rate) $Acc_{wo}$ in cases where the pruning is not performed (Step S2).

The threshold calculating unit 14*a* sets the initial value of the trust radius (Step S3).

The threshold calculating unit 14*a* calculates the threshold T for each layer and the pruning error for each layer to be for setting the pruning rates (Step S4), and determines whether or not the L2 norm of the thresholds T of all layers are larger than the trust radius (Step S5). If the L2 norm of the thresholds T of all layers are equal to or smaller than the trust radius (NO in Step S5), the process proceeds to Step S7.

If the L2 norm of the thresholds T of all layers are larger than the trust radius (YES in Step S5), the threshold calculating unit 14*a* scales (updates) the thresholds such that the L2 norm of the thresholds T of all layers become equal to the trust radius (Step S6), and the process proceeds to Step S7.

In Step S7, the threshold calculating unit 14*a* provisionally calculates the pruning rate for each layer. For example, the threshold calculating unit 14*a* provisionally sets the pruning rate for each layer among the set pruning rate candidates. Steps S4 to S7 are examples of the process of (i) described above.

The calculating unit 14 determines whether or not the layers for which the pruning rates are provisionally calculated include a layer just before concat (Step S8). If the layers for which the pruning rates are provisionally calculated do not include a layer just before concat (NO in Step S8), the process proceeds to Step S10.

If the layers for which the pruning rates are provisionally calculated include a layer just before concat (YES in Step S8), the calculating unit 14 executes the process of Step S9 and then the process proceeds to Step S10.

In Step S9, the calculating unit 14 specifies multiple layers just before concat that are to input tensors into the same concat unit 154 for each concat unit 154 on the basis of the configuration information and the like. Then the calculating unit 14 adjusts the provisionally calculated pruning rates and the elements of the targets of pruning between the layers just before concat. For example, the calculating unit 14 applies the conditions (I) and (II) to the elements (e.g., channels) of the targets between the layers just before concat and updates the pruning rates and the elements of the target such that the layers just before concat have the same number of elements of target (e.g., the number of channels) (see FIG. 18).

The machine learning unit 13 prunes the trained model 11c at the pruning rates provisionally calculated or adjusted by the threshold calculating unit 14a, and executes machine learning again on the model after the pruning. The calculating unit 14 calculates the inference accuracy $Acc_p$ of the model after the re-executed machine learning (Step 10).

The determining unit 14b determines whether or not the inference accuracy $Acc_p$+margin $Acc_m$ is equal to or higher than the inference accuracy $Acc_{wo}$ (Step S11). The evaluation of the inference accuracy (recognition rate) can compensate the mistakes in selecting the pruning rates due to the approximation error.

If the inference accuracy $Acc_p$+the margin $Acc_m$ is equal to or higher than the inference accuracy $Acc_{wo}$ (YES in Step S11), the determining unit 14b determines to prune the trained model 11c at the provisionally calculated pruning rates (Step S12), and stores, as the pruning rates 11d, the provisionally calculated pruning rates into the memory unit 11. Further, the threshold calculating unit 14a increases the trust radius by multiplying the trust radius by a constant factor (Step S13), and the process proceeds to Step S16.

On the other hand, if the inference accuracy $Acc_p$+margin $Acc_m$ is lower than the inference accuracy $Acc_{wo}$ (NO in Step S11), the determining unit 14b discards the provisionally calculated pruning rates (Step S14). The threshold calculating unit 14a decreases the trust radius by multiplying the trust radius by a constant factor (Step S15), and the process proceeds to Step S16. Steps S10 to S15 are examples of the process of (ii) described above.

In Step S16, the determining unit 14b determines whether or not the search (processes of Steps S4 to S15) has been performed predetermined times, in other words, whether or not the predetermined condition is satisfied regarding the execution times of the processes including the threshold calculation, the pruning rate candidate selection, and the pruning rate determination. If the search has not been performed the predetermined times (NO in Step S16), the process moves to Step S4.

If the search has been performed the predetermined times (YES in Step S16), the outputting unit 15 outputs the determined pruning rates 11d (Step S17), and the process ends. Step S16 is an example of the process of (iii) described above.

As described above, by the threshold calculating unit 14a, the server 1 according to the one embodiment calculates the errors in the tensors used for the NN, which errors are generated by the pruning, and generates the thresholds from the values of the loss functions and the gradients obtained by the backpropagation of the NN. Further, the threshold calculating unit 14a compares the calculated errors in the pruning with the thresholds to provisionally calculate the pruning rates. Furthermore, the determining unit 14b compares the inference accuracy of the model after re-learning at the calculated pruning rates with the inference accuracy of the unpruned model, and determines the pruning rate for each layer. At this time, if the inference accuracy of the case with the pruning is determined to be deteriorated as compared to the inference accuracy of the case without the pruning, the threshold calculate unit 14a resets the upper limit of the threshold such that the thresholds is decreased, and searches for the pruning rates again.

Thus, the server 1 according to the one embodiment can determine the pruning rate for each layer regardless of the type of the layers. For example, the server 1 can determine the pruning rates to be applied to the trained model 11c that includes a convolutional layer to which no BN layer is connected, a fully connected layer, and the like for each individual layer.

Even if the NN 160 includes the concat units 161 to 168, the server 1 can enhance the possibility that at least one of the layer just before concat can be pruned, so that the compression ratio of the data size of the down-sized model 11e can be enhanced.

<1-6> Modifications

Next, modifications according to the one embodiment will be described. The following description assumes, for simplicity, that the margin $Acc_m$ of the inference accuracy is "0", in other words, in comparing the inference accuracy, it is determined whether or not the inference accuracy $Acc_p$ is equal to or higher than the inference accuracy $Acc_{wo}$. In the following description, the NN is assumed not to include the concat unit, but the process described with reference to FIGS. 16-20 can be applied likewise to either the following first and second modifications.

<1-6-1> First Modification

In the method according to the one embodiment, the number of times of searches for the pruning rates (the number of attempts of the process (iii)) is a hyperparameter manually set by, for example, a designer. As a result, for example, if the number of times of searches is set to be small, the trained model 11c may be insufficiently down-sized, and if the number of times of searches is set to be large, the trained model 11c may be sufficiently downsized, but search durations may become longer.

Figure 22:
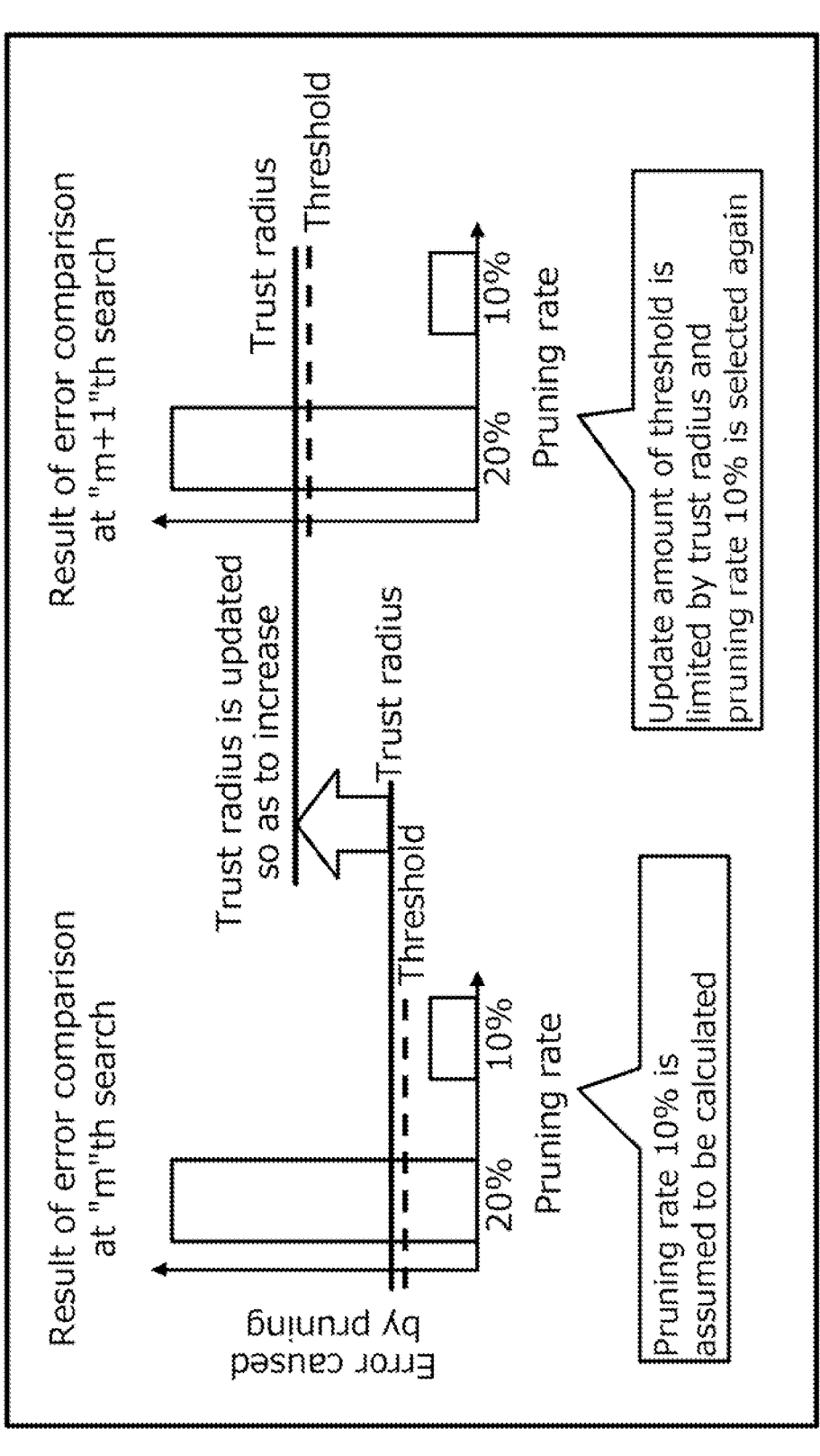
FIG. 22 is a diagram illustrating an example of a result of pruning error comparison in response to updating of a trust radius in the method according to the one embodiment.

FIG. 22 is a diagram illustrating an example of a result of the pruning error comparison in response to the update on the trust radius in the method according to the one embodiment.

As illustrated in FIG. 22, in the result of the error comparison at the "m"th (m is an integer equal to or greater than "1") search, the pruning rate of "10%" is assumed to be calculated (determined). In this case, the trust radius is updated so as to be increased by being multiplied by the constant K. However, if the trust radius after the update is smaller than the error according to the pruning rate candidate one size larger than the pruning rate candidate determined at the "m"th time, even in the result of the error comparison at the "m+1"th search, the pruning rate of "10%" is to be calculated again.

As such, when the trust radius is multiplied by the constant K or the constant k, the update amount of the threshold is limited by the trust radius, so that the same pruning rate candidates may be adopted in multiple searches. Such a state where combinations of the same pruning rates are searched for multiple times leads to an increase in the times of searches for the pruning rates while the pruning of the model is suppressed from being sufficiently attempted.

In view of this, a first modification describes, by focusing on the update on the trust radius, a method for shortening (decreasing) the search durations (the times of searches) for the pruning rates appropriate to downsize the NN.

Figure 23:
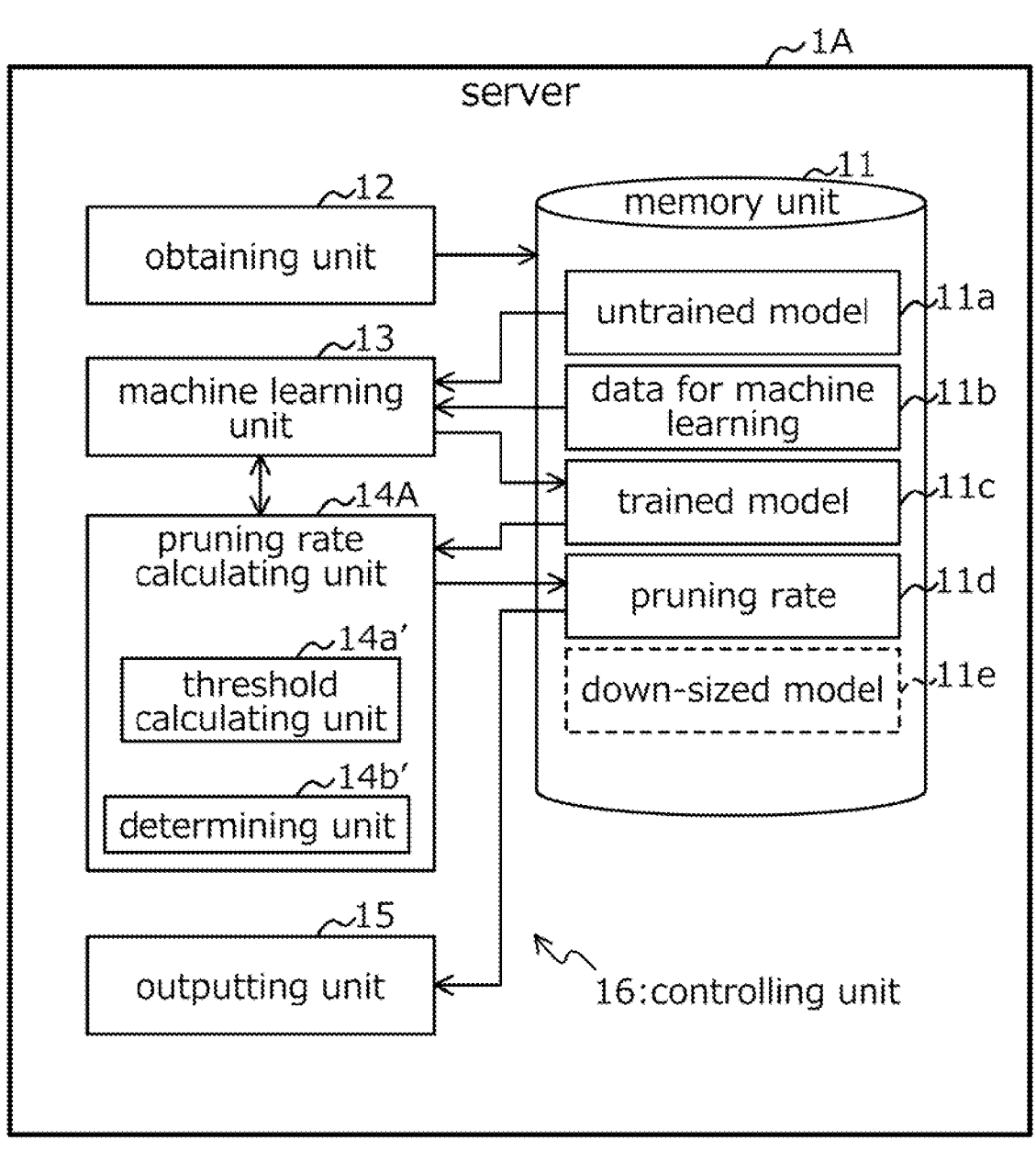
FIG. 23 is a block diagram illustrating an example of a functional configuration of a server according to a first modification.

FIG. 23 is a block diagram illustrating an example of a functional configuration of a server 1A according to the first modification. As illustrated in FIG. 23, the server 1A may include a calculating unit 14A that differs from the server 1 of FIG. 4. The calculating unit 14A may include a threshold calculating unit 14$a$' and a determining unit 14$b$' which differ from the calculating unit 14 of FIG. 4.

The calculating unit 14A searches for combinations of different pruning rates in each search. The state where the selected combination has the pruning rate of "0%" for all of the layers represents that the calculating unit 14A is assumed to determine not to search the pruning rates any more. Under such a premise, the calculating unit 14A (determining unit 14$b$') terminates the searching when the combination in which the pruning rate is "0%" for all of the layers is selected.

In accordance with the comparison result of the inference accuracy by the determining unit 14$b$', the threshold calculating unit 14$a$' measures, for each layer i (i is an integer equal to or greater than 1), an absolute value "$E_{diff,i}$" of a different amount between the threshold and the error in the pruning rate one size larger than the searched pruning rate or the error in the searched pruning rate.

For example, when the inference accuracy $Acc_p$ is equal to or higher than the inference accuracy $Acc_{wo}$, the threshold calculating unit 14$a$' measures the absolute value "$E_{diff,i}$" of the different amount between the threshold and the error in the pruning rate one size larger than the searched pruning rate.

On the other hand, when the inference accuracy $Acc_p$ is lower than the inference accuracy $Acc_{wo}$, the threshold calculating unit 14$a$' measures the absolute value "$E_{diff,i}$" of the different amount between the threshold and the error in the searched pruning rate.

As illustrated by the following equation (7), the threshold calculating unit 14$a$' acquires the smallest value (different amount) "$E_{diff}$" from the calculated absolute values "$E_{diff,i}$" of the different amounts of all layers.

$$E_{diff} = \min (E_{diff,1}, E_{diff,2}, \dots , E_{diff,i}) \qquad (7)$$

In accordance with the comparison result of the inference accuracy by the determining unit 14$b$', the threshold calculating unit 14$a$' updates the trust radius by adopting either one with a larger variation from the trust radius multiplied by a constant factor and the sum of or a difference between the trust radius and the different amount "$E_{diff}$".

For example, when the inference accuracy $Acc_p$ is equal to or higher than the inference accuracy $Acc_{wo}$, the threshold calculating unit 14$a$' adopts one with the larger variation from the trust radius multiplied by the constant K and the sum of the trust radius and the different amount "$E_{diff}$", and consequently, updates the trust radius so as to increase the trust radius.

On the other hand, when the inference accuracy $Acc_p$ is lower than the inference accuracy $Acc_{wo}$, the threshold calculating unit 14$a$' adopts one with the larger variation from the trust radius multiplied by the constant k and the difference between the trust radius and the different amount "$E_{diff}$", and consequently, updates the trust radius to so as to decrease the trust radius.

In this manner, the threshold calculating unit 14$a$' updates the trust radius such that the combinations of the pruning rate candidates of the multiple layers differ in each execution of selecting (in other words, searching) the pruning rate candidates.

Figure 24:
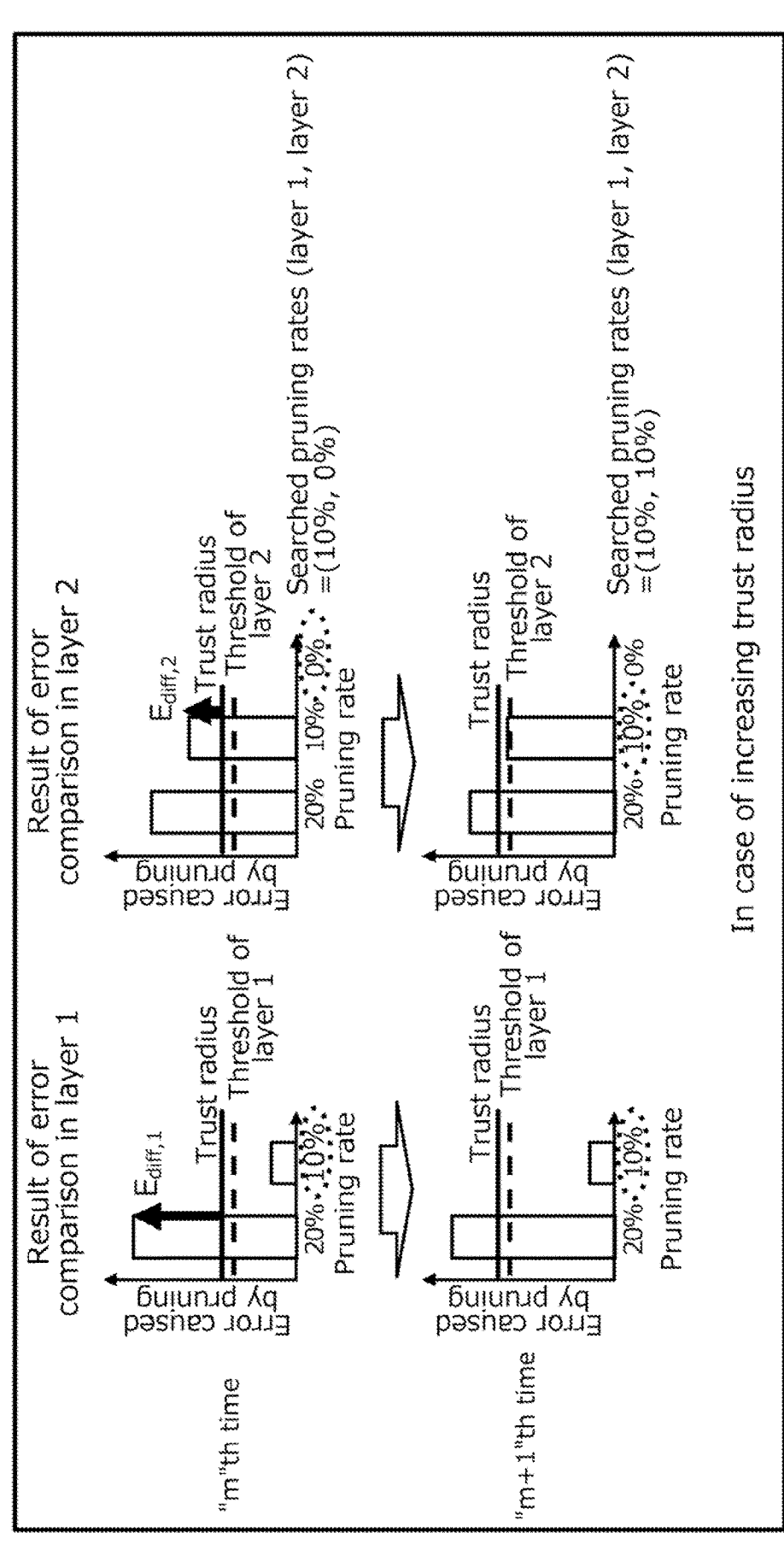
FIG. 24 is a diagram explaining an example of a trust radius update process in a case of increasing the trust radius.

FIG. 24 is a diagram explaining an example of a trust radius update process in case of increasing the trust radius. As illustrated in FIG. 24, it is assumed that the pruning rates searched at "m"th time are "(layer 1, layer 2)=(10%, 0%)". The threshold calculating unit 14$a$' calculates the absolute value "$E_{diff,1}$" of the different amount between the trust radius and the error in the pruning rate "20%" for the layer 1, and the absolute value "$E_{diff,2}$" of the different amount between the trust radius and the error in the pruning rate "10%" for the layer 2. In accordance with the above equation (7), the threshold calculating unit 14$a$' acquires, as the "$E_{diff}$", the different amount "$E_{diff,2}$" having a smaller value.

Then, the threshold calculating unit 14$a$' determines (updates) the trust radius at the "m+1"th (next) time according to the following equation (8).

(Trust radius at "$m + 1$"$th$ time) = $\qquad$ (8)

$\qquad$ max((Trust radius at "$m$"$th$ time·Constant $K$), $\qquad\qquad$ (Trust radius at "$m$"$th$ time + $E_{diff}$))

As a result, at least a value equal to or greater than the "sum of the trust radius and the different amount" is selected as the trust radius at the "m+1"th time, so that in the "m+1"th time, a bit width different from the "m"th time is calculated as the pruning rate.

In the example of FIG. 24, the trust radius (upper limit of the threshold) at the "m+1"th search coincides with the error in the pruning rate "10%" for the layer 2. Therefore, at the "m+1"th search, the pruning rates "(layer 1, layer 2)=(10%, 10%)", which compose the combination of the pruning rates different from the previous time, are searched.

Figure 25:
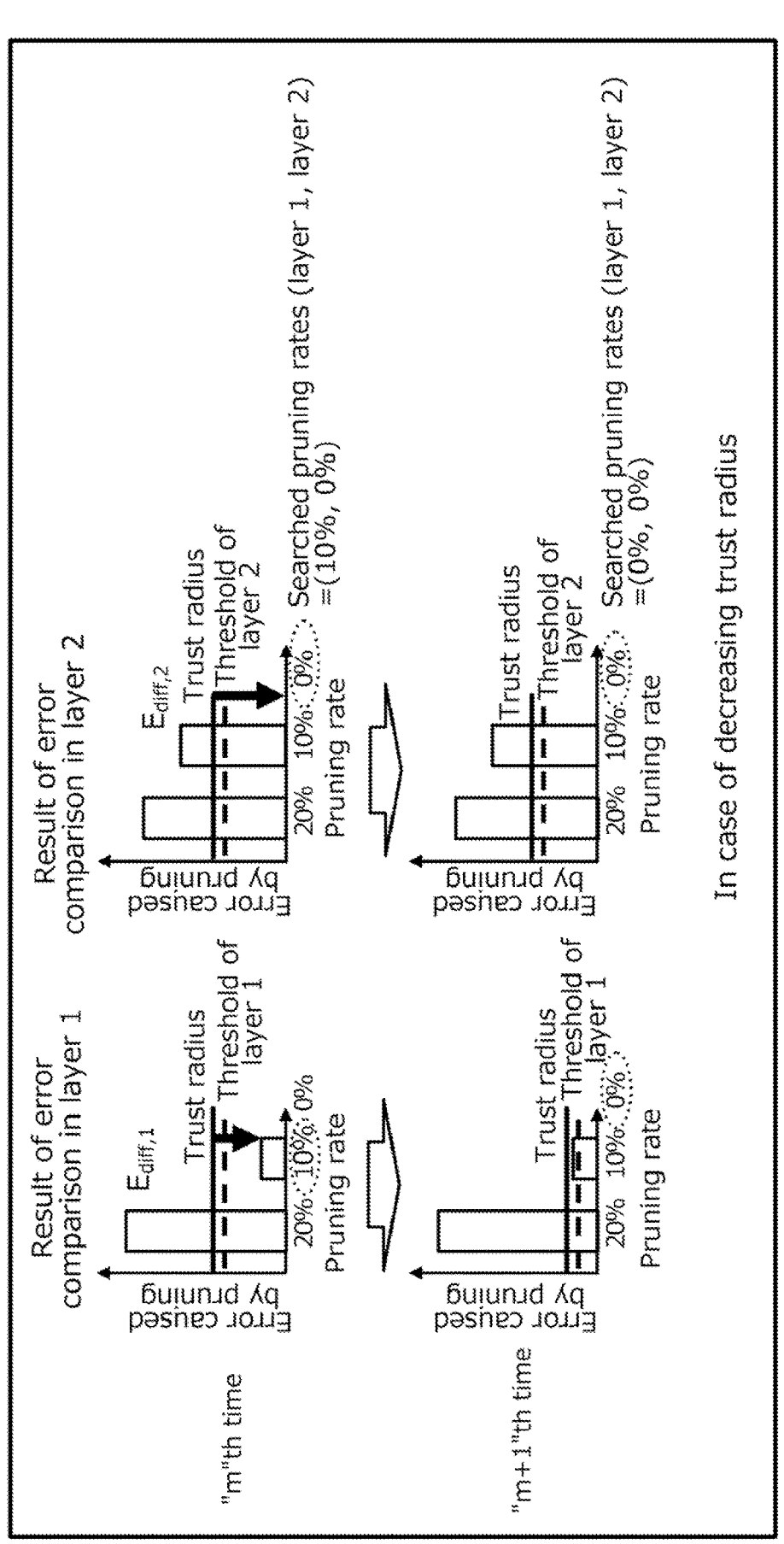
FIG. 25 is a diagram explaining an example of the trust radius update process in a case of decreasing the trust radius.

FIG. 25 is a diagram explaining an example of the trust radius update process in a case of decreasing the trust radius. As illustrated in FIG. 25, the pruning rates searched at the "m"th time are assumed to be "(layer 1, layer 2)=(10%, 0%)". The threshold calculating unit 14$a$' calculates the absolute value "$E_{diff,1}$" of the different amount between the trust radius and the error in the pruning rate "10%" for the layer 1, and the absolute value "$E_{diff,2}$" of the different amount between the trust radius and the error in the pruning rate "0%" for the layer 2. In accordance with the above equation (7), the threshold calculating unit 14$a$' acquires, as the "$E_{diff}$", the different amount "$E_{diff,1}$" having a smaller value.

Then, the threshold calculating unit 14$a$' determines (updates) the trust radius at the "m+1"th (next) time according to the following equation (9).

(Trust radius at "$m + 1$"$th$ time) = $\qquad$ (9)

$\qquad$ max((Trust radius at "$m$"$th$ time·Constant factor), $\qquad\qquad$ (Trust radius at "$m$"$th$ time − $E_{diff}$))

As a result, at least a value equal to or greater than the "difference between the trust radius and the different amount" is selected as the trust radius at the "m+1"th time, so that in the "m+1"th time, a bit width different from the "m"th time is calculated as the pruning rate.

In the example of FIG. 25, the trust radius (upper limit of the threshold) at the "m+1"th search coincides with the error in the pruning rate "0%" for the layer 1. Therefore, at the "m+1"th search, the pruning rates "(layer 1, layer 2)=(0%, 0%), which compose the combination of the pruning rates different from the previous time, are searched.

When the above equations (8) and (9) are generalized, the trust radius at the next time can be expressed by the following equation (10).

$$\text{Trust radius at next time} = \tag{10}$$
$$\text{Current trust radius} * \max(\text{Constant factor}, \text{Qscale\_min})$$

In the above equation (10), the constant factor is K or k, "Qscale\_min" is "Qscale" represented by the following equation (11), and "Qscale" is represented by the following equation (12).

$$\text{Qscale\_min} = \tag{11}$$
$$\min(\text{Qscale calculated in all quantization target vectors})$$
$$\text{Qscale} = 1 + \text{Qdiff}/\text{Qth} \tag{12}$$

In the above equation (12), "Qdiff" is the "different amount between the threshold and the quantization error in a bit width one size narrower than the provisionally calculated bit width (pruning ratio)", and "Qth" is the threshold.

Figure 26:
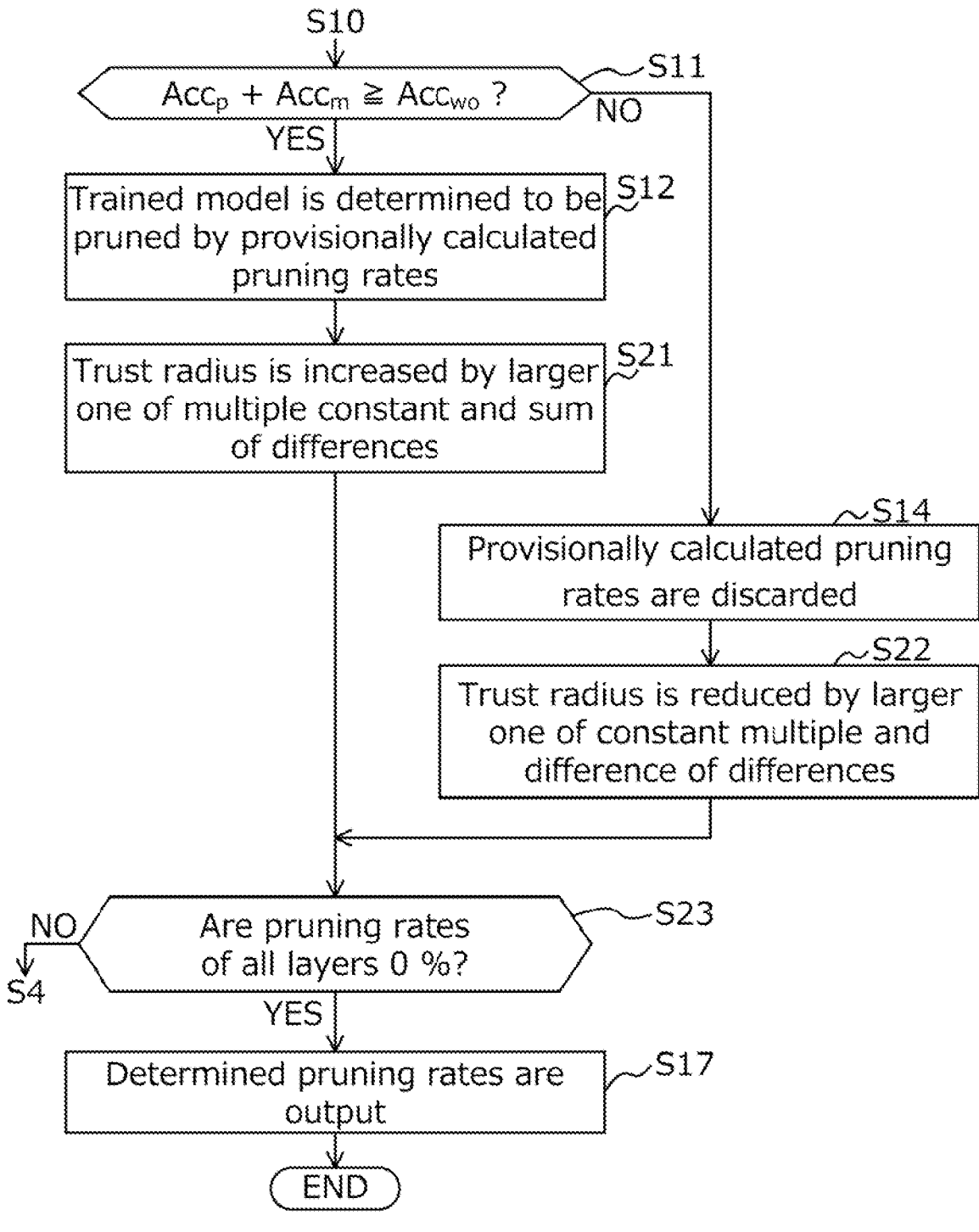
FIG. 26 is a flowchart for explaining an operation example of processes by the server according to the first modification.

Next, referring to FIG. 26, an operation example of the server 1A according to the first modification will be described. FIG. 26 is a flowchart for explaining an operation example of the processes by the server 1A according to the first modification. FIG. 26 corresponds to the flowchart in which Steps S13, S15 and S16 of the flowchart according to the server 1 illustrated in FIG. 21 are replaced with Steps S21, S22, and S23, respectively. Also in the first modification, the threshold calculating unit 14a' sets the initial value of the trust radius in Step S3.

In Step S21, the threshold calculating unit 14a' increases the trust radius by using larger one of the multiplication of the constant K and the "sum of the different amount", and the process proceeds to Step S23.

In Step S22, the threshold calculating unit 14a' decreases the trust radius by using larger one of the multiplication of the constant k and the "difference from the different amount", and the process proceeds to Step S23.

In Step S23, the determining unit 14b' determines whether or not the pruning rates 11d of all layers are "0%", in other words, whether or not the pruning rates satisfy the predetermined condition. If the pruning rate 11d of at least one layer is not "0%" (NO in Step S23), the process moves to Step S4.

If the pruning rates 11d of all layers are "0%" (YES in Step S23), the outputting unit 15 outputs the determined pruning rates 11d (Step S17), and the process ends.

As described above, the first modification differs from the one embodiment in the method for updating the trust radius by the threshold calculating unit 14a' and the end condition for determining the end of searching by the determining unit 14b'. Thus, the server 1A can search for the pruning rates appropriate for sufficiently downsizing the NN in shortest durations (least number of times). In addition, it is possible to omit the setting (designation) of the times of searches by the designer or the like.

<1-6-2> Second Modification

In the methods according to the one embodiment and the first modification, the initial value of the trust radius is a hyperparameter set by a designer or the like.

Even when the times of searches are the same, the model size may differ between the cases where the initial value of the trust radius is set to be large and where the initial value of the trust radius is set to be small. In addition, when the initial value of the trust radius is set to be large, the times of searches required for the model size to be sufficiently diminished may increase as compared with the case where the initial value of the trust radius is set to be small.

As such, depending on the initial value of the trust radius, the final model size and the times of searches for the pruning rates may vary, in other words, the performance of the servers 1 and 1A may varies.

Therefore, a second modification describes a method for suppressing variation in the performance of the servers 1 and 1A.

Figure 27:
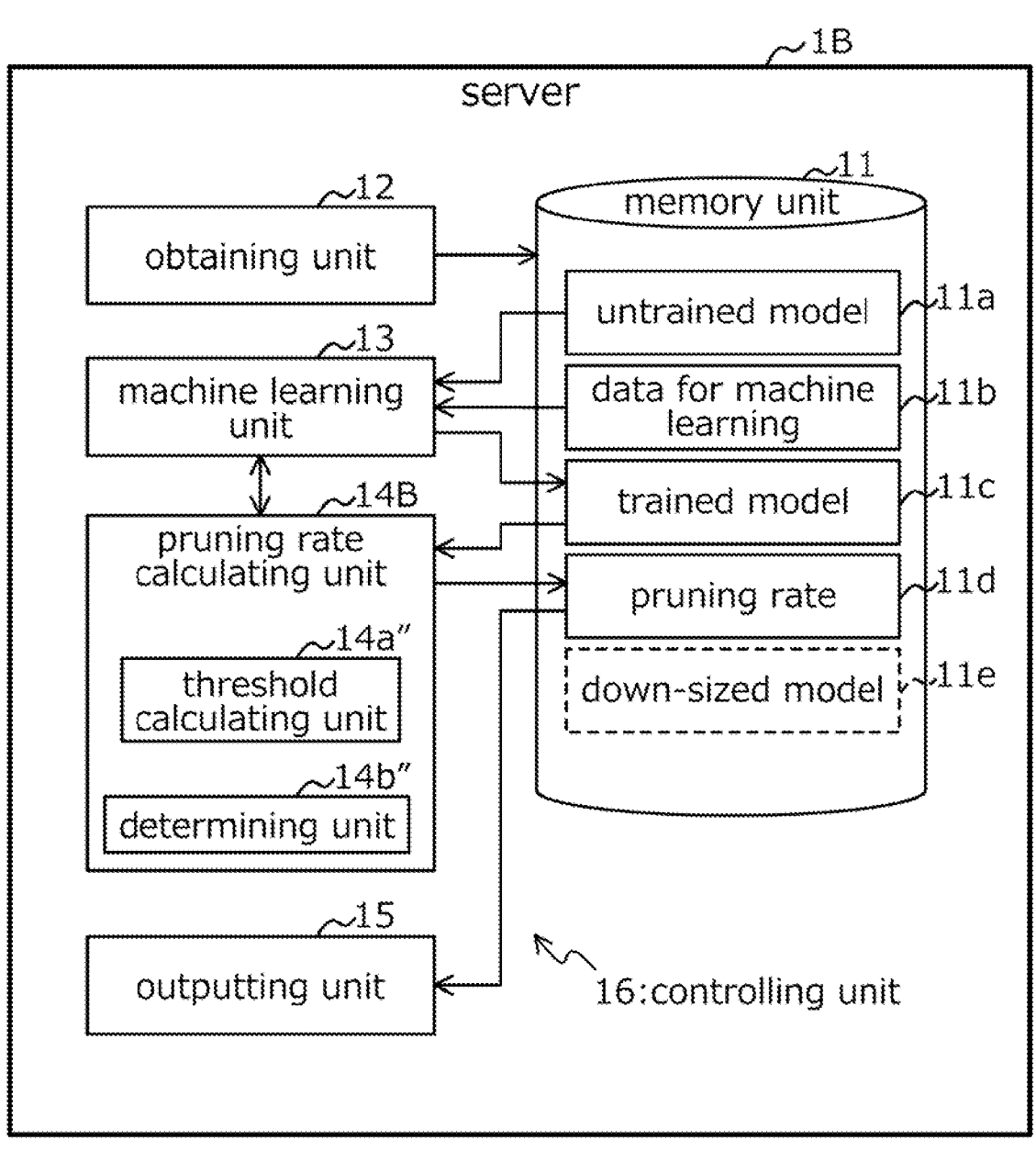
FIG. 27 is a block diagram illustrating an example of a functional configuration of a server according to a second modification.

FIG. 27 is a block diagram illustrating an example of a functional configuration of a server 1B according to the second modification. As illustrated in FIG. 27, the server 1B may include a calculating unit 14B different from the server 1 of FIG. 4. The calculating unit 14B may include a threshold calculating unit 14a" and a determining unit 14b", which differ from the calculating unit 14 of FIG. 4.

In pruning a model, it is known that gradually pruning the model by using low pruning rates can maintain accuracy and compress the model at a high compression rate as compared with pruning the model at once by using high pruning rates.

As illustrated in the above equation (5), since the threshold T is set according to the reciprocal of the gradient, layers with large thresholds T represent layers with small gradients. The layers with small gradients have small effect on the accuracy even when pruned.

Therefore, the server 1B (threshold calculating unit 14a") sets, for example, the initial value of the trust radius to be a value such that the pruning rate in the first search becomes the minimum. For this, the threshold calculating unit 14a" may, for example, set the initial value of the trust radius to be a value that causes, among all layers, the layer where the threshold T is the maximum to be pruned and the remaining layer(s) to be unpruned (such that the pruning rates become "0%").

By setting the initial value of the trust radius as described above, the server 1B can further compress the model size or maintain the accuracy as compared to the case where the initial value of the trust radius is manually set, for example, to be large.

Figure 28:
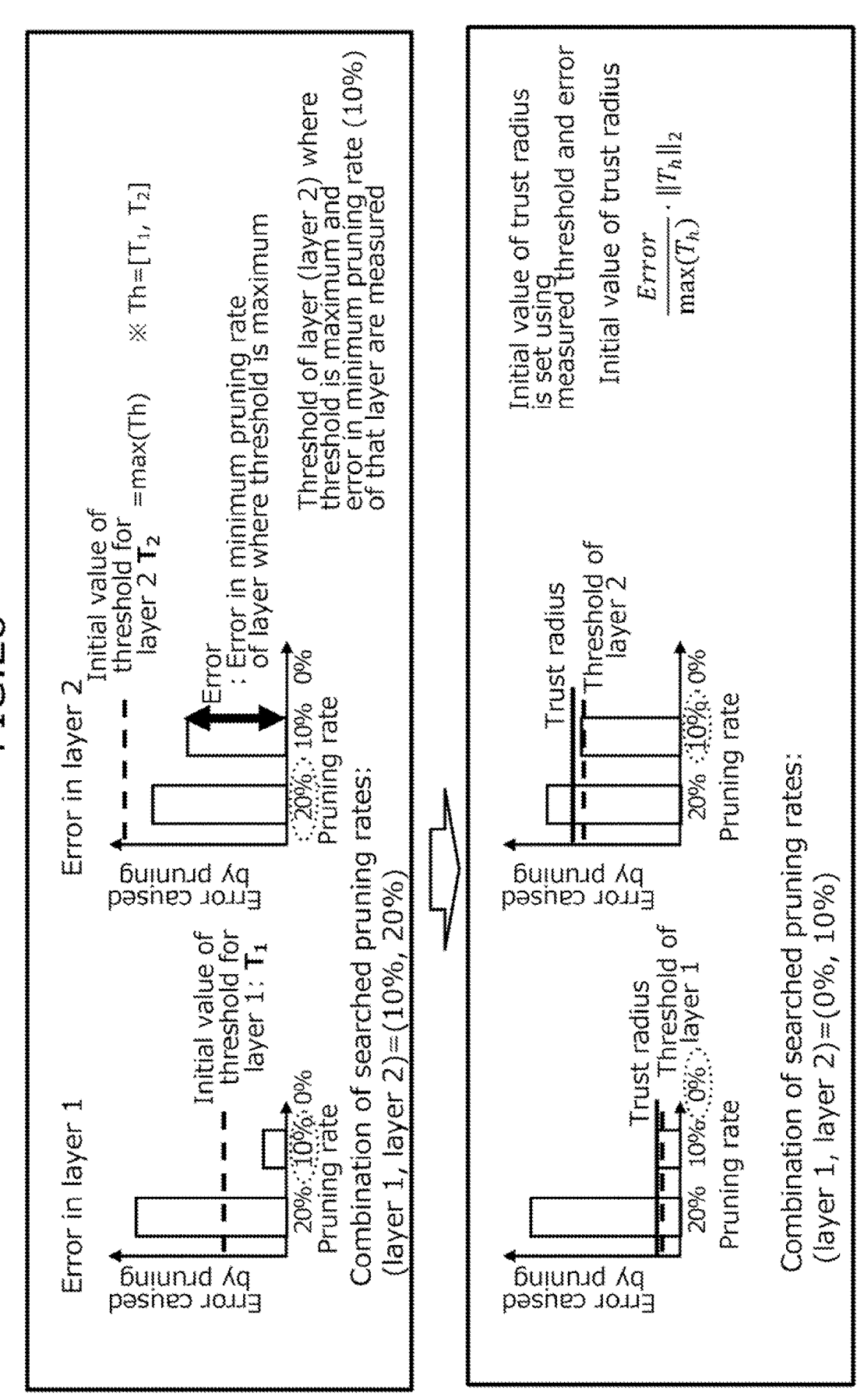
FIG. 28 is a diagram explaining an example of a setting of the initial value of the trust radius.

FIG. 28 is a diagram explaining an example of a setting of the initial value of the trust radius. As illustrated in the upper part of FIG. 28, when the initial value of the trust radius is not set, the combination of the pruning rates to be searched is "(layer 1, layer 2)=(10%, 20%)".

As illustrated in FIG. 28, in the first search for the pruning rates, the threshold calculate unit 14a" measures, among all layers, the threshold (max(Th)) of the layer where the threshold is the maximum and the error (Error) caused by the minimum (except for "0%") pruning rate in the layer.

Th represents a vector according to the threshold $T_1, T_2, \ldots$ for each layer, and in the example of FIG. 28, Th=[T$_1$, T$_2$]. The threshold (max(Th)) is the threshold for the layer where the threshold is the maximum, and is T$_2$ in the example of FIG. 28. The error (Error) is the error in the minimum pruning rate for the layer where the threshold is the maximum, and in the example of FIG. 28, the error in the pruning rate "10%" for the layer 2 is measured.

Next, using the measured threshold and the error, the threshold calculating unit 14a" sets the initial value of the trust radius according to the following equation (13). In the following equation (13), "‖Th‖$_2$" is the L2 norm of the thresholds of all layers.

[Equation 7]

$$\text{Initial value of trust radius} = \frac{\text{Error}}{\max(T_h)} \cdot \|T_h\|_2 \tag{13}$$

The threshold calculating unit 14a" sets the thresholds T$_1$, T$_2$ such that the minimum pruning rate "10%" is selected as the pruning rate of the layer having the maximum threshold (layer 2) and the pruning rate "0%" is selected in the remaining layer (layer 1) by the initial value of the calculated trust radius.

Thus, as illustrated in the lower part of FIG. 28, when the initial value of the trust radius is set and the thresholds T$_1$, T$_2$ are set, the combination of the pruning rates to be searched becomes "(layer 1, layer 2)=(0%, 10%)". Since the layer (layer 2) of the pruning target is the layer where the threshold is the maximum, in other words, the gradient is the minimum, the effect on the accuracy by the pruning can be suppressed small.

The function of the threshold calculating unit 14a" other than the process of setting the initial value of the trust radius may be similar to the function of at least one of the threshold calculating unit 14a according to the one embodiment and the threshold calculating unit 14a' according to the first modification. The determining unit 14b" may be similar to at least one of the determining unit 14b according to the one embodiment and the determining unit 14b' according to the first modification.

That is, the method according to the second modification may be realized by a combination of one of or both the one embodiment and the first modification.

Figure 29:
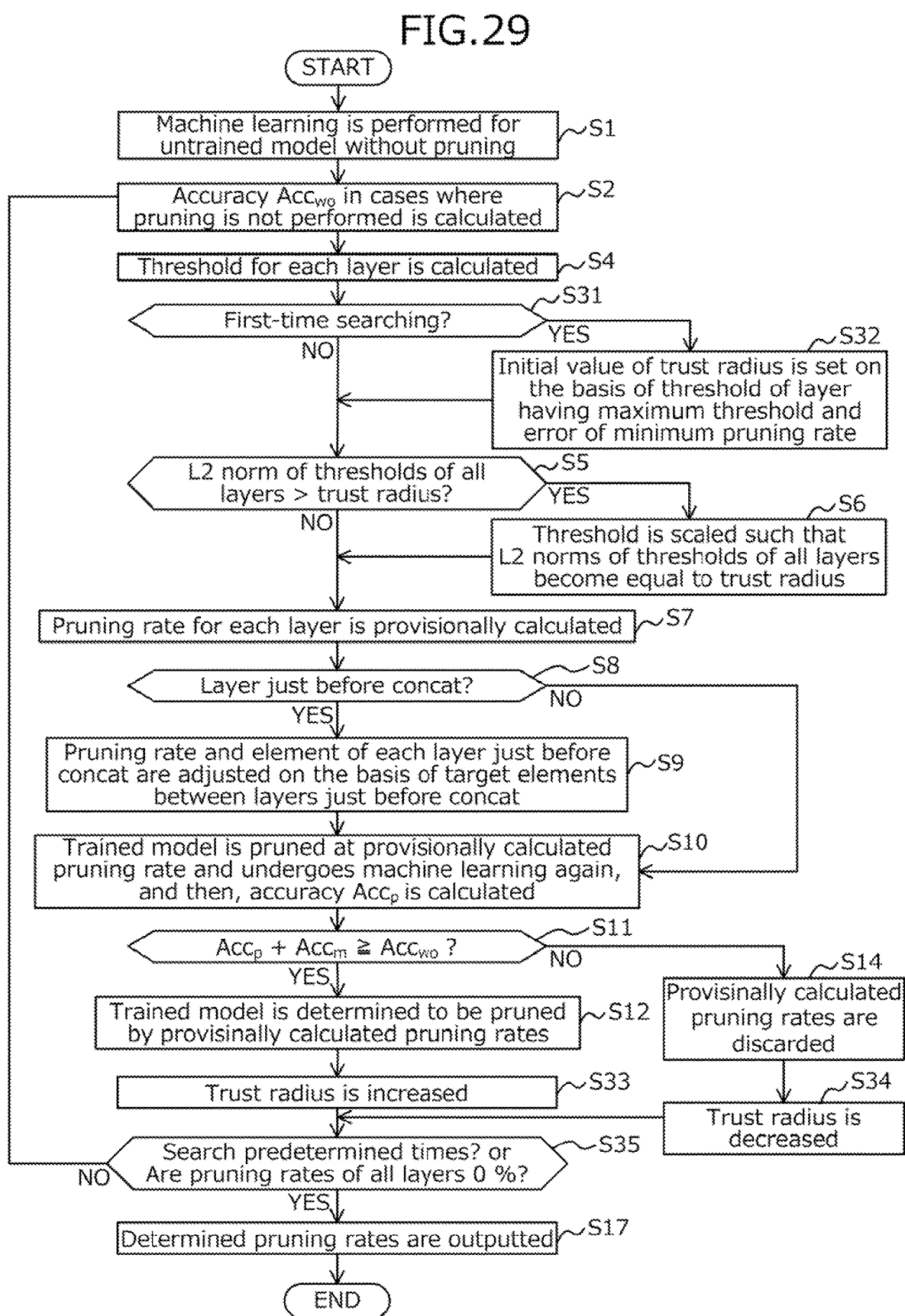
FIG. 29 is a flowchart for explaining an operation example of processes by the server according to the second modification.

Next, referring to FIG. 29, an operation example of the server 1B according to the second modification will be described. FIG. 29 is a flowchart for explaining an operation example of the processes by the server 1B according to the second modification. FIG. 29 corresponds to the flowchart in which, of the flowchart according to the server 1 illustrated in FIG. 21, Step S3 is deleted, Steps S31 and S32 are added between Steps S4 and S5, and Steps S13, S15, and S16 are replaced with Steps S33, S34, and S35, respectively.

In Step S31, after calculating the threshold for each layer in Step S4, the threshold calculating unit 14a" determines whether or not the search is the first time. When the search is not the first time (NO in Step S31), the process proceeds to Step S5.

When the search is the first time (YES in Step S31), the threshold calculating unit 14a" sets the initial value of the trust radius based on the threshold and the minimum pruning rate error in the layer where the threshold is the maximum (Step S32), and the process proceeds to Step S5.

Steps S33, S34, and S35 may be either Steps S13, S15, and S16 illustrated in FIG. 21 or Steps S21, S22, and S23 illustrated in FIG. 26, respectively.

As described above, the second modification uses the method for setting the initial value of the trust radius by the threshold calculating unit 14a" that differs from the methods of the first embodiment and the first modification. Thus, the server 1B can suppress variation in the final model size and the times of searches for the pruning rates, and can suppress variation in the performance of the servers 1 and 1A.

Furthermore, the server 1B can suppress manual setting of the initial value (hyperparameter) of the trust radius by a designer or the like, and can dynamically set the initial value of the trust radius according to the layers of the trained models 11c. Therefore, appropriate pruning rates can be set for each model, and regardless of the model, the variation in the final model size and the times of searches for the pruning rates can be suppressed, so that variation in the performance of the servers 1 and 1A can be suppressed.

<1-7> Example of Hardware Configuration

The servers 1, 1A, and 1B according to the one embodiment and the first and second modifications may each be a virtual machine (VM; Virtual Machine) or a physical machine. The functions of the servers 1, 1A, and 1B may be realized by one computer or by two or more computers. At least some of the functions of the servers 1, 1A, and 1B may be implemented using HW (Hardware) resources and NW (Network) resources provided by cloud environments.

Figure 30:
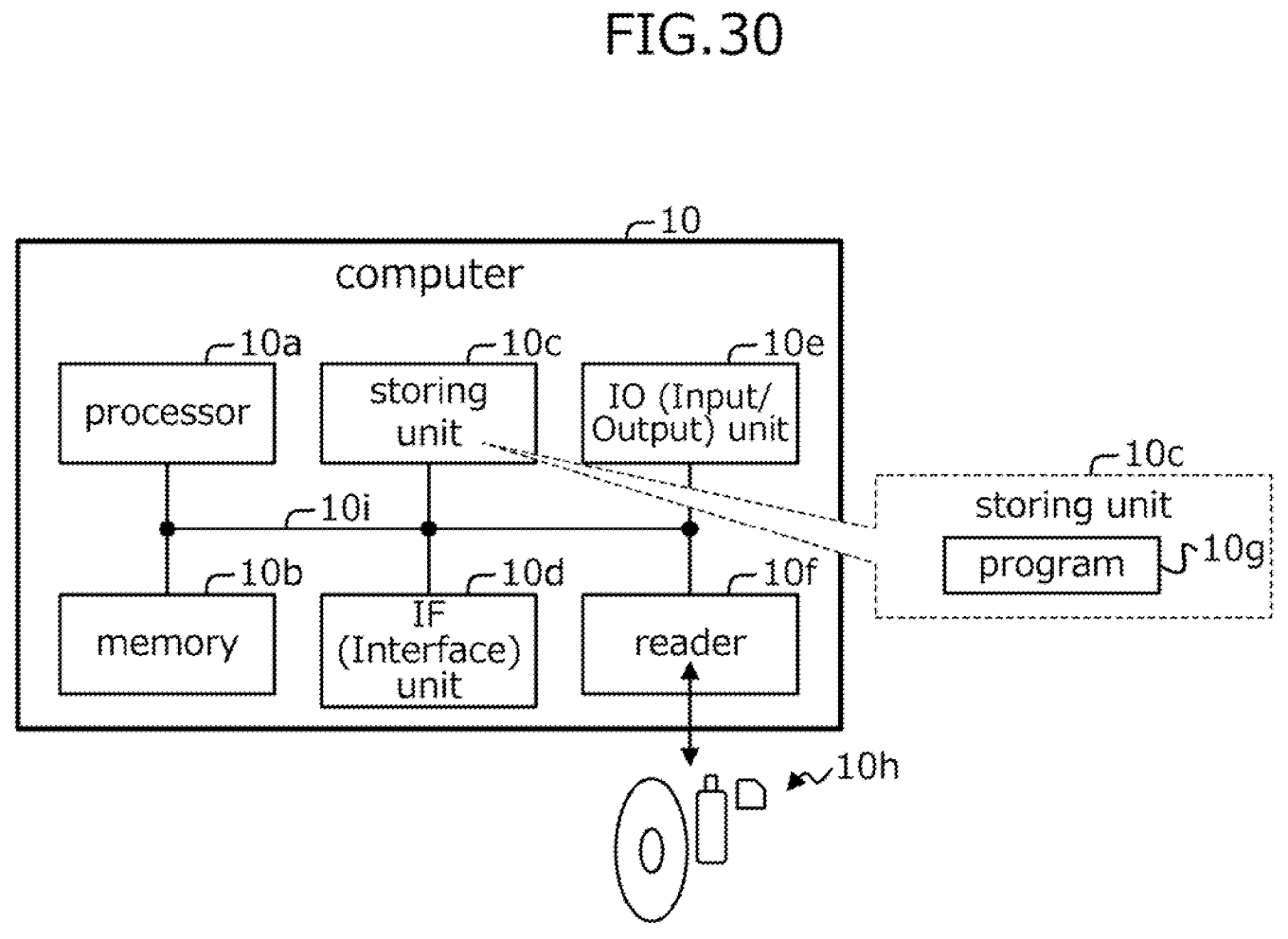

FIG. 30 is a block diagram illustrating an example of a hardware configuration of a computer 10. Hereinafter, the computer 10 is exemplified as the hardware (HW) that realizes each function of the servers 1, 1A, and 1B. When multiple computers are used as the HW resources for realizing each function of the servers 1, 1A, and 1B, each computer may include the HW configuration illustrated in FIG. 30.

As illustrated in FIG. 30, the computer 10 may illustratively include, as the HW configuration, a processor 10a, a memory 10b, a storing unit 10c, an IF (Interface) unit 10d, an IO (Input/Output) unit 10e, and a reader 10f.

The processor 10a is an example of an arithmetic processing device that performs various controls and calculations. The processor 10a may be connected to each block in the computer 10 via a bus 10i so as to mutually communicable. The processor 10a may be a multi-processor including multiple processors or a multi-core processor having multiple processor cores, or may be configured to have multiple multi-core processors.

The processor 10a may be, for example, an integrated circuit (IC; Integrated Circuit) such as a CPU (Central Processing Unit), an MPU (Micro Processing Unit), a GPU (Graphics Processing Unit), an APU (Accelerated Processing Unit), a DSP (Digital Signal Processor), an ASIC (Application Specific IC), or an FPGA (Field-Programmable Gate Array).

As the processor 10a, a combination of two or more of the integrated circuits described above may be used. As an example, the computer 10 may include first and second processors 10a. The first processor 10a is an example of a CPU that executes a program 10g (machine learning program) that realizes all or a part of various functions of the computer 10. For example, based on the programs 10g, the first processor 10a may realize the functions of the obtaining unit 12, the calculating unit 14, 14A or 14B, and the outputting unit 15 of the server 1, 1A or 1B (see FIG. 4, 23, or 27). The second processor 10a is an example of an accelerator that executes an arithmetic process used for NN calculation such as matrix calculation, and may realize, for example, the function of the machine learning unit 13 of the server 1, 1A, or 1B (see FIG. 4, 23, or 27).

The memory 10*b* is an example of an HW that stores various data and programs. The memory 10*b* may be, for example, at least one of a volatile memory such as a DRAM (Dynamic Random Access Memory) and a nonvolatile memory such as a PM (Persistent Memory).

The storing unit 10*c* is an example of an HW that stores information such as various data and programs. The storing unit 10*c* may be, for example, a magnetic disk device such as an HDD (Hard Disk Drive), a semiconductor drive device such as an SSD (Solid State Drive), or various storage devices such as nonvolatile memories. The nonvolatile memory may be, for example, a flash memory, an SCM (Storage Class Memory), a ROM (Read Only Memory), or the like.

The storing unit 10*c* may store the program 10*g*. For example, the processor 10*a* of the servers 1, 1A, and 1B can realize functions as the controlling unit 16 of the servers 1, 1A, and 1B (see FIG. 4, 23, or 27) by expanding the program 10*g* stored into the storing unit 10*c* onto the memory 10*b* and executing the program 10*g*.

The memory unit 11 illustrated in FIG. 4, 23, or 27 may be realized by a storage area included in at least one of the memory 10*b* and the storing unit 10*c*.

The IF unit 10*d* is an example of a communication IF that controls the connection and communication with the network. For example, the IF unit 10*d* may include an adapter compatible with a LAN (Local Area Network) such as Ethernet (registered trademark), an optical communication such as FC (Fibre Channel), or the like. The adapter may be adapted to a communication scheme of at least one of a wireless scheme and a wired scheme. For example, the servers 1, 1A, and 1B may be connected to a non-illustrated computer via the IF unit 10*d* so as to be mutually communicable. One or both of the functions of the obtaining unit 12 and the outputting unit 15 illustrated in FIG. 4, 23, or 27 may be realized by the IF unit 10*d*. For example, the program 10*g* may be downloaded from a network to the computer 10 via the communication IF and stored into the storing unit 10*c*.

The IO unit 10*e* may include one of an input device and an output device, or both. The input device may be, for example, a keyboard, a mouse, or a touch panel. The output device may be, for example, a monitor, a projector, or a printer. For example, the outputting unit 15 illustrated in FIG. 4, 23, or 27 may output the pruning rates 11*d* to the output device of the IO unit 10*e* to display the pruning rates 11*d*.

The reader 10*f* is an example of a reader that reads out information on the data and programs recorded on the recording medium 10*h*. The reader 10*f* may include a connection terminal or a device to which the recording medium 10*h* can be connected or inserted. The reader 10*f* may be, for example, an adapter compatible with a USB (Universal Serial Bus) or the like, a drive device that accesses a recording disk, a card reader that accesses a flash memory such as an SD card, etc. The recording medium 10*h* may store the program 10*g*, or the reader 10*f* may read the program 10*g* from the recording medium 10*h* and store it into the storing unit 10*c*.

The recording medium 10*h* may illustratively be a non-transitory computer-readable recording medium such as a magnetic/optical disk or a flash memory. The magnetic/optical disk may illustratively be a flexible disk, a CD (Compact Disc), a DVD (Digital Versatile Disc), a Blu-ray disk, an HVD (Holographic Versatile Disc), or the like. The flash memory may illustratively be a solid state memory such as a USB memory or an SD card.

The HW configuration of the computer 10 described above is merely illustrative. Thus, the HW of the computer 10 may appropriately undergo increase or decrease (e.g., addition or deletion of arbitrary blocks), division, integration in arbitrary combinations, and addition or deletion of the bus. For example, the servers 1, 1A, and 1B may omit at least one of the IO unit 10*e* and the reader 10*f*.

<2> Miscellaneous

The above-described technique according to the embodiment and the first and second modifications can be modified and implemented as follows.

For example, the obtaining unit 12, the machine learning unit 13, the calculating unit 14, 14A or 14B, and the outputting unit 15 included in the server 1, 1A or 1B illustrated in FIG. 4, 23, or 27 may be merged or may each be divided.

For example, the server 1, 1A, or 1B illustrated in FIG. 4, 23, or 27 may be configured to realize each processing function by multiple devices cooperating with each other via networks. As an example, in the server 1, 1A, or 1B, the obtaining unit 12 and the outputting unit 15 may be a web server and an application server, the machine learning unit 13 and the calculating unit 14, 14A or 14B may be an application server, the memory unit 11 may be a database server, or the like. In this case, the web server, the application server, and the DB server may realize the processing function as the server 1, 1A, or 1B by cooperating with each other via networks.

Further, the method of applying the conditions (I) and (II) to a NN including the concat unit described with reference to FIGS. 16-20 is not limited to application to the pruning accomplished by the servers 1, 1A, and 1B respectively illustrated in FIGS. 4, 23, and 17.

Alternatively, the method of applying the conditions (I) and (II) may be applied to various method for determining the pruning rates for each layer of a NN.

As one aspect, the present disclosure can realize downsizing of a neural network including multiple layers.

Throughout the descriptions, the indefinite article "a" or "an", or adjective "one" does not exclude a plurality.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a machine learning program comprising instructions which, when the machine learning program is executed by a computer, cause the computer to execute a process comprising:

calculating a plurality of thresholds of errors in tensors between before and after reduction one for each element of a plurality of layers in a trained model of a neural network including the plurality of layers, the neural network including a calculating process that outputs a tensor serving as a result of a given calculation on a tensor from a first layer and one or more tensors of one or more second layers preceding the first layer;

selecting, as a pruning rate, one from a plurality of pruning rate candidates each presenting a rate of elements to be pruned from one or more elements in each of the plurality of layers based on the plurality of thresholds and errors in tensors between before and after reduction in cases where the elements are pruned by each of the plurality of pruning rate candidates in each of the plurality of layers;

adjusting a first pruning rate and one or more second pruning rates by determining elements to be pruned in the first layer and the one or more second layers based on one or more elements to be reduced when the first layer is pruned at a first pruning rate selected as the pruning rate for the first layer and one or more elements to be reduced when the one or more second layers are pruned at the one or more second pruning rates selected as the pruning rates for the one or more second layers; retraining a pruned model to obtain a retrained pruned model, the pruned model being obtained by pruning each element of the plurality of layers in the trained model according to the pruning rates selected or adjusted; and determining the pruning rate to be applied to each of the plurality of layers based on inference accuracy of the trained model not being subjected to pruning and inference accuracy of the retrained pruned model.

2. The non-transitory computer-readable recording medium according to claim 1, wherein the adjusting includes adjusting the first pruning rate and the one or more second pruning rates such that a number of elements of the tensor from the first layer matches a number of elements of each of the one or more tensors from the one or more second layers.

3. The non-transitory computer-readable recording medium according to claim 1, wherein the adjusting includes adjusting the first pruning rate and the one or more second pruning rates such that one or more elements to be reduced in all of the first layer and the one or more second layers is regarded as one or more elements to be reduced when each of the first layer and the one or more second layers are pruned and that one or more elements not to be reduced in at least one of the first layer and the one or more second layers is excluded from one or more elements to be reduced when each of the first layer and the one or more second layers are pruned.

4. The non-transitory computer-readable recording medium according to claim 1, wherein the element is one selected from a group consisting of a channel, a weight, and a node.

5. A computer-implemented method for machine learning comprising:

calculating a plurality of thresholds of errors in tensors between before and after reduction one for each element of a plurality of layers in a trained model of a neural network including the plurality of layers, the neural network including a calculating process that outputs a tensor serving as a result of a given calculation on a tensor from a first layer and one or more tensors of one or more second layers preceding the first layer;

selecting, as a pruning rate, one from a plurality of pruning rate candidates each presenting a rate of elements to be pruned from one or more elements in each of the plurality of layers based on the plurality of thresholds and errors in tensors between before and after reduction in cases where the elements are pruned by each of the plurality of pruning rate candidates in each of the plurality of layers;

adjusting a first pruning rate and one or more second pruning rates by determining elements to be pruned in the first layer and the one or more second layers based on one or more elements to be reduced when the first layer is pruned at a first pruning rate selected as the pruning rate for the first layer and one or more elements to be reduced when the one or more second layers are pruned at the one or more second pruning rates selected as the pruning rates for the one or more second layers;

retraining a pruned model to obtain a retrained pruned model, the pruned model being obtained by pruning each element of the plurality of layers in the trained model according to the pruning rates selected or adjusted; and determining the pruning rate to be applied to each of the plurality of layers based on inference accuracy of the trained model not being subjected to pruning and inference accuracy of the retrained pruned model.

6. The computer-implemented method according to claim 5, wherein the adjusting includes adjusting the first pruning rate and the one or more second pruning rates such that a number of elements of the tensor from the first layer matches a number of elements of each of the tensors from the one or more second layers.

7. The computer-implemented method according to claim 5, wherein the adjusting includes adjusting the first pruning rate and the one or more second pruning rates such that one or more elements to be reduced in all of the first layer and the one or more second layers is regarded as one or more elements to be reduced when each of the first layer and the one or more second layers are pruned and that one or more elements not to be reduced in at least one of the first layer and the one or more second layers is excluded from one or more elements to be reduced when each of the first layer and the one or more second layers are pruned.

8. The computer-implemented method according to claim 5, wherein the element is one selected from a group consisting of a channel, a weight, and a node.

9. An information processing apparatus comprising:

a memory; and a processor coupled to the memory, the processor being configured to execute a process comprising:

calculating a plurality of thresholds of errors in tensors between before and after reduction one for each element of a plurality of layers in a trained model of a neural network including the plurality of layers, the neural network including a calculating process that outputs a tensor serving as a result of a given calculation on a tensor from a first layer and one or more tensors of one or more second layers preceding the first layer;

selecting, as a pruning rate, one from a plurality of pruning rate candidates each presenting a rate of elements to be pruned from one or more elements in each of the plurality of layers based on the plurality of thresholds and errors in tensors between before and after reduction in cases where the elements are pruned by each of the plurality of pruning rate candidates in each of the plurality of layers;

adjusting a first pruning rate and one or more second pruning rates by determining elements to be pruned in the first layer and the one or more second layers based on one or more elements to be reduced when the first layer is pruned at a first pruning rate selected as the pruning rate for the first layer and one or more elements to be reduced when the one or more second layers are pruned at the one or more second pruning rates selected as the pruning rates for the one or more second layers;

retraining a pruned model to obtain a retrained pruned model, the pruned model being obtained by pruning each element of the plurality of layers in the trained model according to the pruning rates selected or adjusted; and determining the pruning rate to be applied to each of the plurality of layers based on inference accuracy of the trained model not being subjected to pruning and inference accuracy of the retrained pruned model.

10. The information processing apparatus according to claim 9, wherein the adjusting includes adjusting the first pruning rate and the one or more second pruning rates such that a number of elements of the tensor from the first layer matches a number of elements of each of the tensors from the one or more second layers.

11. The information processing apparatus according to claim 9, wherein the adjusting includes adjusting the first pruning rate and the one or more second pruning rates such that one or more elements to be reduced in all of the first layer and the one or more second layers is regarded as one or more elements to be reduced when each of the first layer and the one or more second layers are pruned and that one or more elements not to be reduced in at least one of the first layer and the one or more second layers is excluded from one or more elements to be reduced when each of the first layer and the one or more second layers are pruned.

12. The information processing apparatus according to claim 9, wherein the element is one selected from a group consisting of a channel, a weight, and a node.

13. The non-transitory computer-readable recording medium according to claim 1, wherein the selecting and the adjusting are repeated while changing the plurality of thresholds according to inference accuracy of the trained model not being subjected to pruning and inference accuracy of a pruned model after machine learning, and the process further comprises determining the pruning rate to be applied to each of the plurality of layers based on a result of the repeating.

14. The computer-implemented method according to claim 6, wherein the selecting and the adjusting are repeated while changing the plurality of thresholds according to inference accuracy of the trained model not being subjected to pruning and inference accuracy of a pruned model after machine learning, and the process further comprises determining the pruning rate to be applied to each of the plurality of layers based on a result of the repeating.

15. The information processing apparatus according to claim 9, wherein the selecting and the adjusting are repeated while changing the plurality of thresholds according to inference accuracy of the trained model not being subjected to pruning and inference accuracy of a pruned model after machine learning, and the process further comprises determining the pruning rate to be applied to each of the plurality of layers based on a result of the repeating.

\* \* \* \* \*